United States Patent
Hijikata et al.

(10) Patent No.: US 11,722,087 B2
(45) Date of Patent: Aug. 8, 2023

(54) PWM SIGNAL MEASUREMENT DEVICE, MOTOR DRIVE CONTROL DEVICE, PWM SIGNAL MEASUREMENT METHOD, AND MOTOR DRIVE CONTROL METHOD

(71) Applicant: MINEBEA MITSUMI Inc., Nagano (JP)

(72) Inventors: Hidetoshi Hijikata, Hamamatsu (JP); Toshihiro Tamitsuji, Iwata (JP)

(73) Assignee: MINEBEA MITSUMI Inc., Nagano (JP)

( * ) Notice: Subject to any disclaimer, the term of this patent is extended or adjusted under 35 U.S.C. 154(b) by 24 days.

(21) Appl. No.: 17/630,723

(22) PCT Filed: Jun. 9, 2020

(86) PCT No.: PCT/JP2020/022641
§ 371 (c)(1),
(2) Date: Jan. 27, 2022

(87) PCT Pub. No.: WO2021/029128
PCT Pub. Date: Feb. 18, 2021

(65) Prior Publication Data
US 2022/0263450 A1 Aug. 18, 2022

(30) Foreign Application Priority Data
Aug. 9, 2019 (JP) .................. 2019-147147

(51) Int. Cl.
*H02P 27/08* (2006.01)
(52) U.S. Cl.
CPC .................... *H02P 27/08* (2013.01)
(58) Field of Classification Search
CPC .......... H02P 27/00; H02P 27/04; H02P 27/06; H02P 27/08; H02P 27/085; H02P 21/00;
(Continued)

(56) References Cited

U.S. PATENT DOCUMENTS

| 8,072,180 B1* | 12/2011 | Sachs ................. G01R 19/2506 318/807 |
| 2016/0352279 A1 | 12/2016 | Mishima et al. |
| 2021/0075347 A1 | 3/2021 | Watanabe et al. |

FOREIGN PATENT DOCUMENTS

| JP | 07-043406 A | 2/1995 |
| JP | 2010-283908 A | 12/2010 |

(Continued)

OTHER PUBLICATIONS

International Search Report for corresponding International Application No. PCT/JP2020/022641 dated Sep. 1, 2020.
(Continued)

*Primary Examiner* — Antony M Paul
(74) *Attorney, Agent, or Firm* — Pearne & Gordon LLP

(57) ABSTRACT

The present application makes it possible to measure a PWM signal in a wide frequency range. A PWM signal measurement device (20) includes: a first duty cycle measurement unit (24) of a capture type configured to measure a frequency (f) and a duty cycle of a PWM signal (Sc); a voltage measurement unit (23) configured to measure a smoothed voltage (Vad) obtained by smoothing the PWM signal using a smoothing circuit (13); a second duty cycle measurement unit (25) of a smoothing type configured to measure a duty cycle of the PWM signal on the basis of a measured voltage value (Vadm) of the smoothed voltage; and a measurement-type selecting unit (26) configured to select one of the capture type or the smoothing type on the basis of a measured value of the frequency and a measured value of the smoothed voltage.

13 Claims, 21 Drawing Sheets

(58) Field of Classification Search
CPC .......... H02P 21/22; H02P 23/00; H02P 23/07; H02P 23/14; H02P 25/00; H02P 25/06; H02P 25/064; H02P 25/024; H02P 25/145; H02P 7/00; H02P 7/29; H02P 7/04; H02P 7/245; H02P 7/292; H02P 6/00; H02P 6/06; H02P 6/08; H02P 6/12; H02P 6/15; H02P 6/17; H02P 1/00; H02P 1/42; H02P 1/46; H02P 1/24; H02P 1/26
See application file for complete search history.

(56) References Cited

FOREIGN PATENT DOCUMENTS

| | | |
|---|---|---|
| JP | 2016-226263 A | 12/2016 |
| WO | 2019/073633 A1 | 4/2019 |

OTHER PUBLICATIONS

Written Opinion for corresponding International Application No. PCT/JP2020/022641 dated Sep. 1, 2020 and English translation.

* cited by examiner

PWM SIGNAL MEASUREMENT DEVICE, MOTOR DRIVE CONTROL DEVICE, PWM SIGNAL MEASUREMENT METHOD, AND MOTOR DRIVE CONTROL METHOD

TECHNICAL FIELD

The present invention relates to a PWM signal measurement device, a motor drive control device, a method of measuring a PWM signal, and a method of controlling motor drive, and also relates to a PWM signal measurement device used to measure a duty cycle of a PWM signal.

BACKGROUND ART

A motor drive control device is known for controlling a rotational speed of a motor in accordance with a speed instruction signal inputted from an upper layer device. For example, as the speed instruction signal, it is know that a fan motor or the like uses a signal (hereinafter, simply referred to as a "PWM signal") having a duty cycle corresponding to a target rotational speed of the motor through pulse width modulation (PWM).

For example, upon input of a PWM signal serving as the speed instruction signal from the upper layer device, the motor drive control device measures a duty cycle of the PWM signal, and calculates a target rotational speed on the basis of the measured duty cycle to control the motor so that the motor rotates at the target rotational speed.

Known techniques for measuring a duty cycle of a PWM signal include a capture type and a smoothing type.

The capture type is a type using a clock with a frequency higher than a PWM signal to measure a cycle of the PWM signal, a high period in which the PWM signal is at a high level, and a low period in which the PWM signal is at a low level, on the basis of a change in edges of the PWM signal (pulse) of a measurement target (see Patent Document 1).

The smoothing type is a type in which a PWM signal serving as a measurement target is smoothed using a low-pass filter (smoothing circuit) to obtain a smoothed voltage, and the smoothed voltage is measured to measure a duty cycle of the PWM signal (see Patent Document 2).

CITATION LIST

Patent Literature

Patent Document 1: JP 2010-283908 A
Patent Document 2: JP 2016-226263 A

SUMMARY OF INVENTION

Technical Problem

A conventional motor drive control device decides whether the capture type is employed or the smoothing type is employed, in accordance with a frequency (cycle) of a PWM signal (speed instruction signal) used in an application to which a motor is applied.

Conventionally, in a case of employing the capture type, in order to ensure the accuracy of measurement of the duty cycle of the PWM signal, it is necessary to limit, in the specifications, a frequency range of the PWM signal that can be used, or it is necessary to sacrifice the linearity of the rotational speed of the motor at or around 0% and at or around 100% of the duty cycle. In addition, in a case of employing the smoothing type, in order to ensure the accuracy of measurement of the duty cycle of the PWM signal, the time constant of a low-pass filter (smoothing circuit) needs to be adjusted for each applicable range of frequency of a PWM signal to be used.

In this manner, with the conventional motor drive control device, in a case where the frequency range of a speed instruction signal (PWM signal) varies depending on applications or the like to which a motor is applied, it is necessary to appropriately design a circuit used to measure a duty cycle of the speed instruction signal in accordance with a frequency range of the speed instruction signal for each application. This leads to an increase in a period of time for designing the motor drive control device and an increase in the manufacturing cost.

The present invention has been made in view of the problem described above, and an object of the present invention is to achieve measurement of a PWM signal in a wide frequency range.

Solution to Problem

A PWM signal measurement device according to a typical embodiment of the present invention includes: a first duty cycle measurement unit of a capture type configured to use a measurement clock to measure a period based on an edge of a PWM signal, to measure a frequency and a duty cycle of the PWM signal on the basis of a measured value of the period; a voltage measurement unit configured to measure a smoothed voltage obtained by smoothing the PWM signal using a smoothing circuit; a second duty cycle measurement unit of a smoothing type configured to measure a duty cycle of the PWM signal on the basis of a measured value of the smoothed voltage; and a measurement-type selecting unit configured to select one of the capture type or the smoothing type as a measurement type for measuring a duty cycle of the PWM signal, on the basis of a measured value of the frequency of the PWM signal and a measured value of the smoothed voltage.

Advantageous Effects of Invention

With the PWM signal measurement device according to the present invention, it is possible to measure a PWM signal in a wide frequency range.

DESCRIPTION OF EMBODIMENTS

1. Overview of Embodiment

Figure 1:
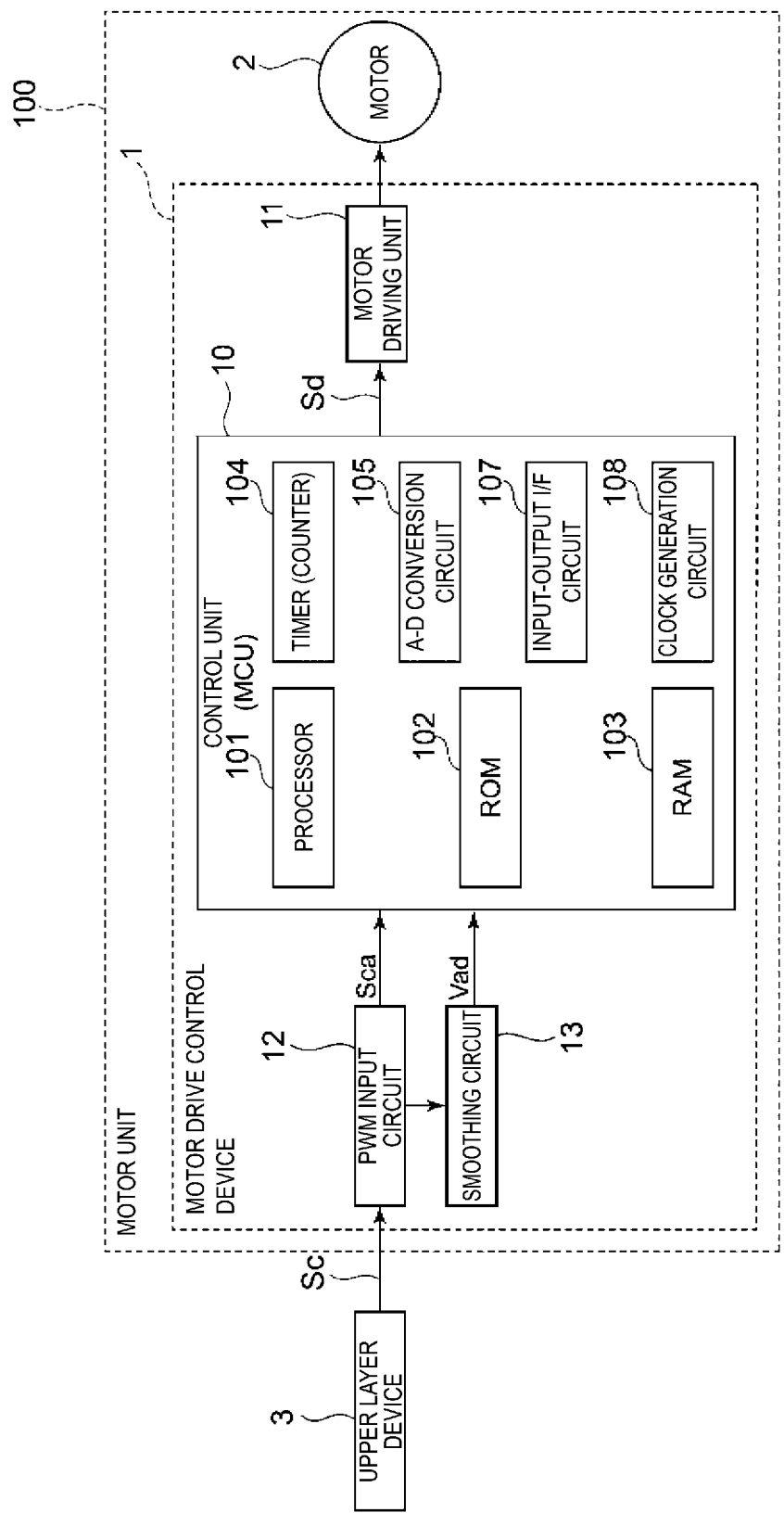
FIG. 1 is a block diagram illustrating a configuration of a motor unit 100 including a motor drive control device according to a first embodiment.

First, an overview of a typical embodiment of the invention disclosed in the present application will be described. Note that, in the following description, reference signs in the drawings corresponding to the constituent elements of the invention are mentioned in parentheses as an example.

[1] A PWM signal measurement device (20, 20A) according to a typical embodiment of the present invention includes: a first duty cycle measurement unit (24) of a capture type configured to measure a period based on an edge of a PWM signal (PWM signal Sc) using a measurement clock (Clk) to measure a frequency (f) and a duty cycle of the PWM signal on the basis of a measured value of the period; a voltage measurement unit (23) configured to measure a smoothed voltage (Vad) obtained by smoothing the PWM signal using a smoothing circuit (13); a second duty cycle measurement unit (25) of a smoothing type configured to measure a duty cycle of the PWM signal on the basis of a measured voltage value (Vadm) of the smoothed voltage; and a measurement-type selecting unit (26, 26A) configured to select one of the capture type or the smoothing type as a measurement type for measuring a duty cycle of the PWM signal on the basis of a measured value of the frequency of the PWM signal and a measured value of the smoothed voltage.

[2] The PWM signal measurement device (20, 20A) according to [1] described above may be configured such that at least one of the capture type or the smoothing type is assigned, as the measurement type, to each of a plurality of classification regions (A, B, C1, C2, D1, D2, E1, E2, F1, F2, G1, G2, I1, I2, H) for which classification is made on the basis of a threshold value (f_HP, f_AP, f_LP) concerning a frequency of the PWM signal and a threshold value (VL_AP, VL_HP, VH_HP, VH_AP, VL_AP2, VL_HP2, VH_HP2, VH_AP2) concerning a voltage obtained by smoothing the PWM signal, and the measurement-type selecting unit specifies at least one classification region of the plurality of classification regions on the basis of a measured value of the smoothed voltage and a measured value of a frequency of the PWM signal, and selects the measurement type assigned to the specified at least one classification region.

[3] The PWM signal measurement device (20, 20A) according to [2] described above may be configured such that the threshold value concerning a frequency of the PWM signal includes: an upper limit frequency (f_HP) defining an upper limit of a frequency of the PWM signal at which a duty cycle can be measured with the capture type; a lower limit frequency (f_LP) defining a lower limit of a frequency of the PWM signal at which a duty cycle can be measured with the capture type; and a smoothing-possible frequency (f_AP) falling in a range between the upper limit frequency and the lower limit frequency and defining a frequency of the PWM signal at which a duty cycle can be measured with the smoothing type, and the measurement-type selecting unit selects the capture type in a case where a measured value of a frequency of the PWM signal is equal to or less than the smoothing-possible frequency, and selects the capture type or the smoothing type in a case where the measured value of the frequency of the PWM signal is higher than the smoothing-possible frequency.

[4] The PWM signal measurement device (20, 20A) according to [3] described above may be configured such that the threshold value concerning a voltage obtained by smoothing the PWM signal includes: a first low duty side voltage (VH_AP) corresponding to a duty cycle of a pulse having a frequency being the smoothing-possible frequency and including a one-side level period corresponding to one cycle of the measurement clock; and a first high duty side voltage (VL_AP) corresponding to a duty cycle of a pulse having a frequency being the smoothing-possible frequency and including an other-side level period corresponding to one cycle of the measurement clock, and the measurement-type selecting unit (26, 26A) selects a fixed duty cycle that has been set in advance in a case where a measured value of the smoothed voltage falls in a classification region (C1) surrounded by the first low duty side voltage (VH_AP), the upper limit frequency (f_HP), and the lower limit frequency (f_LP), or in a case where the measured value of the smoothed voltage falls in a classification region (C2) surrounded by the first high duty side voltage (VL_AP), the upper limit frequency (f_HP), and the lower limit frequency (f_LP).

[5] The PWM signal measurement device (20, 20A) according to [4] described above may be configured such that the threshold value concerning a voltage obtained by smoothing the PWM signal includes: a second low duty side voltage (VH_HP) corresponding to a duty cycle of a pulse having a frequency being the upper limit frequency and including a one-side level period corresponding to one cycle of the measurement clock; and a second high duty side voltage (VL_HP) corresponding to a duty cycle of a pulse having a frequency being the upper limit frequency and including an other-side level period corresponding to one cycle of the measurement clock, and be configured such that the plurality of classification regions include: a first classification region (D1) surrounded by the first low duty side voltage (VH_AP), the upper limit frequency (f_HP), and a first boundary line (L1) connecting the first low duty side voltage at the smoothing-possible frequency and the second low duty side voltage at the upper limit frequency; and a second classification region (D2) surrounded by the first high duty side voltage (VL_AP), the upper limit frequency (f_HP), and a second boundary line (L2) connecting the first high duty side voltage (VL_AP) at the smoothing-possible frequency and the second high duty side voltage at the upper limit frequency, and the measurement-type selecting unit selects the smoothing type in a case where a specific point specified by a measured value of the smoothed voltage and a measured value of the frequency is disposed in the first classification region or in a case where the specific point is disposed in the second classification region.

[6] The PWM signal measurement device (20) according to [5] described above may be configured such that the plurality of classification regions further include a predetermined classification region (E1+E2+B) surrounded by: the first boundary line (L1) connecting the first low duty side voltage at the smoothing-possible frequency and the second low duty side voltage at the upper limit frequency; the second boundary line (L2) connecting the first high duty side voltage at the smoothing-possible frequency and the second high duty side voltage at the upper limit frequency; the smoothing-possible frequency (f_AP); and the upper limit frequency (f_HP), and the measurement-type selecting unit selects the capture type in a case where the specific point is disposed in the predetermined classification region.

[7] The PWM signal measurement device (20) according to [5] described above may be configured such that the plurality of classification regions further include: a third classification region (E1) surrounded by the first boundary line (L1), the second low duty side voltage (VH_HP), and the smoothing-possible frequency (f_AP); and a fourth classification region (E2) surrounded by the second boundary line (L2), the second high duty side voltage (VL_HP), and the smoothing-possible frequency (f_AP), the measurement-type selecting unit calculates a difference (|DR1−DR2|) between a measured value (DR1) of a duty cycle by the first duty cycle measurement unit and a measured value (DR2) of a duty cycle by the second duty cycle measurement unit in a case where the specific point is disposed in the third classification region or in a case where the specific point is disposed in the fourth classification region, the measurement-type selecting unit selects the capture type in a case where the difference is smaller than a predetermined threshold value, and the measurement-type selecting unit selects the smoothing type in a case where the difference is equal to or more than the predetermined threshold value.

[8] The PWM signal measurement device (20A) according to [5] or [6] described above may be configured to include: a third low duty side voltage (VH_HP2) corresponding to a duty cycle of a pulse having a frequency being the upper limit frequency and including a one-side level period corresponding to two cycles of the measurement clock; and a third high duty side voltage (VL_HP2) corresponding to a duty cycle of a pulse having a frequency being the upper limit frequency and including an other-side level period corresponding to two cycles of the measurement clock, and be configured such that the plurality of classification regions include: a third classification region (F1+I1) surrounded by the third low duty side voltage (VH_HP2), the first boundary line (L1), the smoothing-possible frequency (f_AP), and the upper limit frequency (f_HP); and a fourth classification region (F1+I2) surrounded by the third high duty side voltage (VL_HP2), the second boundary line (L2), the smoothing-possible frequency (f_AP), and the upper limit frequency (f_HP), the measurement-type selecting unit calculates a difference (|DR1−DR2|) between a measured value (DR1) of a duty cycle by the first duty cycle measurement unit and a measured value (DR2) of a duty cycle by the second duty cycle measurement unit in a case where the specific point is disposed in the third classification region or in the fourth classification region, the measurement-type selecting unit selects the capture type in a case where the difference is smaller than a predetermined threshold value, and the measurement-type selecting unit selects the smoothing type in a case where the difference is equal to or more than the predetermined threshold value.

[9] The PWM signal measurement device (20A) according to [8] described above may be configured such that the threshold value concerning a voltage obtained by smoothing the PWM signal includes: a fourth low duty side voltage (VH_AP2) corresponding to a duty cycle of a pulse having a frequency being the smoothing-possible frequency and including a one-side level period corresponding to two cycles of the measurement clock; and a fourth high duty side voltage (VL_AP2) corresponding to a duty cycle of a pulse having a frequency being the smoothing-possible frequency and including an other-side level period corresponding to two cycles of the measurement clock, the plurality of classification regions further include: a fifth classification region (G1) surrounded by the first low duty side voltage (VH_AP), the fourth low duty side voltage (VH_AP2), the smoothing-possible frequency (f_AP), and the lower limit frequency (f_LP); and a sixth classification region (G2) surrounded by the first high duty side voltage (VL_AP), the fourth high duty side voltage (VL_AP2), the smoothing-possible frequency (f_AP), and the lower limit frequency (f_LP), and the measurement-type selecting unit selects a fixed duty cycle that has been set in advance, in a case where the specific point is disposed in the fifth classification region or in a case where the specific point is disposed in the sixth classification region.

[10] The PWM signal measurement device (20, 20A) according to any one of [2] to [9] described above may be configured such that the measurement-type selecting unit (26, 26A) selects the smoothing type in a case where the first duty cycle measurement unit does not measure a duty cycle for a certain period of time.

[11] A motor drive control device (1, 1A) according to a typical embodiment of the present invention includes: a PWM input circuit (12) configured to receive input of a PWM signal (Sc); a smoothing circuit (13) configured to smooth the PWM signal; a control unit (10) configured to generate a control signal and including the PWM signal measurement device (20, 20A) according to any one of [1] to [10] described above configured to input the PWM signal inputted in the PWM input circuit and also input, as the smoothed voltage, a voltage (Vad) obtained by smoothing the PWM signal by the smoothing circuit; and a motor driving unit (11) configured to drive a motor (2) on the basis of the control signal.

[12] A method of measuring a PWM signal according to a typical embodiment of the present invention, includes: a first duty cycle measurement step (S3, S4) using a capture type including measuring a period based on an edge of an inputted PWM signal using a measurement clock to measure a frequency and a duty cycle of the PWM signal on the basis of a measured value of the period; a voltage measurement step (S6) of measuring a smoothed voltage obtained by smoothing the PWM signal using a smoothing circuit; a second duty cycle measurement step (S7) using a smoothing type including measuring a duty cycle of the PWM signal on the basis of a measured value of the smoothed voltage; and a measurement-type selecting step (S8) of selecting one of the capture type or the smoothing type as a measurement type for measuring a duty cycle of the PWM signal on the basis of a measured value of the frequency of the PWM signal and a measured value of the smoothed voltage.

[13] A method of controlling motor drive according to a typical embodiment of the present invention, includes: a PWM input step of receiving input of a PWM signal; a smoothing step of smoothing the PWM signal; a first duty cycle measurement step (S3, S4) using a capture type including measuring a period based on an edge of the PWM signal using a measurement clock to measure a frequency and a duty cycle of the PWM signal on the basis of a measured value of the period; a voltage measurement step (S6) of measuring a smoothed voltage obtained by smoothing the PWM signal using a smoothing circuit; a second duty cycle measurement step (S7) using a smoothing type including measuring a duty cycle of the PWM signal on the basis of a measured value of the smoothed voltage; a measurement-type selecting step (S8) of selecting one of the capture type or the smoothing type as a measurement type for measuring a duty cycle of the PWM signal on the basis of a measured value of the frequency of the PWM signal and a measured value of the smoothed voltage; a control step (S10) of generating a control signal on the basis of the measurement type selected in the measurement-type selecting step; and a motor drive step of driving a motor on the basis of the control signal.

2. Specific Examples of Embodiment

Hereinafter, specific examples of the embodiments of the present invention will be described with reference to the accompanying drawings. Note that, in the following description, constituent elements common to each of the embodiments are denoted with the same reference signs and will not be described repeatedly.

Embodiment 1

FIG. 1 is a block diagram illustrating a configuration of a motor unit 100 including a motor drive control device according to the first embodiment.

The motor unit 100 is applied, for example, to a fan (fan motor) that rotates impellers (bladed wheel) to generate airflow. As illustrated in FIG. 1, the motor unit 100 includes a motor 2 and a motor drive control device 1.

The motor 2 is, for example, a three-phase brushless motor. The motor drive control device 1 is a device used to control rotation of the motor 2. For example, the motor drive control device 1 controls an energizing state of a three-phase coil of the motor 2 on the basis of a drive instruction from an upper layer device 3, thereby controlling rotation and stopping of the motor 2.

As illustrated in FIG. 1, the motor drive control device 1 includes a control unit 10, a motor driving unit 11, a PWM input circuit 12, and a smoothing circuit 13. Note that not all of the constitution elements of the motor drive control device 1 are illustrated in FIG. 1, and the motor drive control device 1 may include other constitution elements, in addition to the constitution elements illustrated in FIG. 1.

The motor driving unit 11 is a functional unit that energizes coils of individual phases of the motor 2 to drive the motor 2. The motor driving unit 11 outputs a drive signal to the motor 2 on the basis of a control signal Sd outputted from the control unit 10 that will be described later, to drive the motor 2. The motor driving unit 11 includes, for example, an inverter circuit (not illustrated) comprised of a plurality of switching elements (for example, transistors) coupled to coils of individual phases of the motor 2, and a pre-drive circuit (not illustrated) configured to drive each of the switching elements of the inverter circuit on the basis of the control signal Sd. The motor driving unit 11 uses the pre-drive circuit to switch the plurality of switching elements constituting the inverter circuit, and for example, converts DC electric power supplied from a DC power supply into three-phase alternating current. In addition, the motor driving unit 11 applies a driving current of three-phase alternating current to the motor 2 to rotate the rotor of the motor 2.

The control unit 10 generates a control signal Sd used to control drive of the motor 2, on the basis of a speed instruction signal Sc serving as a drive instruction from the upper layer device 3 and inputted through the PWM input circuit 12 and the smoothing circuit 13.

For example, the control unit 10 includes hardware elements including a processor 101 such as a CPU, a ROM 102, a RAM 103, a timer (counter) 104, an A-D conversion circuit 105, an input-output I/F circuit 107, a clock generation circuit 108, and the like, and is a program processing device (for example, microcontroller: MCU) having individual constituent elements coupled to each other through a bus or a dedicated line.

In the present embodiment, the control unit 10 is one semiconductor (integrated circuit: IC) in a form of package. However, the control unit 10 is not limited to this.

Here, the speed instruction signal Sc is a signal used to give an instruction of a target rotational speed of the motor 2. For example, the speed instruction signal Sc is a pulse signal used to give an instruction of a target rotational speed of the motor 2 using a duty cycle. In other words, the speed instruction signal Sc is a PWM signal having a duty cycle corresponding to the target rotational speed. Hereinafter, the speed instruction signal Sc is also referred to as a "PWM signal Sc."

The PWM input circuit 12 is a circuit configured to receive input of the PWM signal Sc serving as the speed instruction signal. The smoothing circuit 13 is a circuit configured to smooth the PWM signal Sc.

Figure 2A:
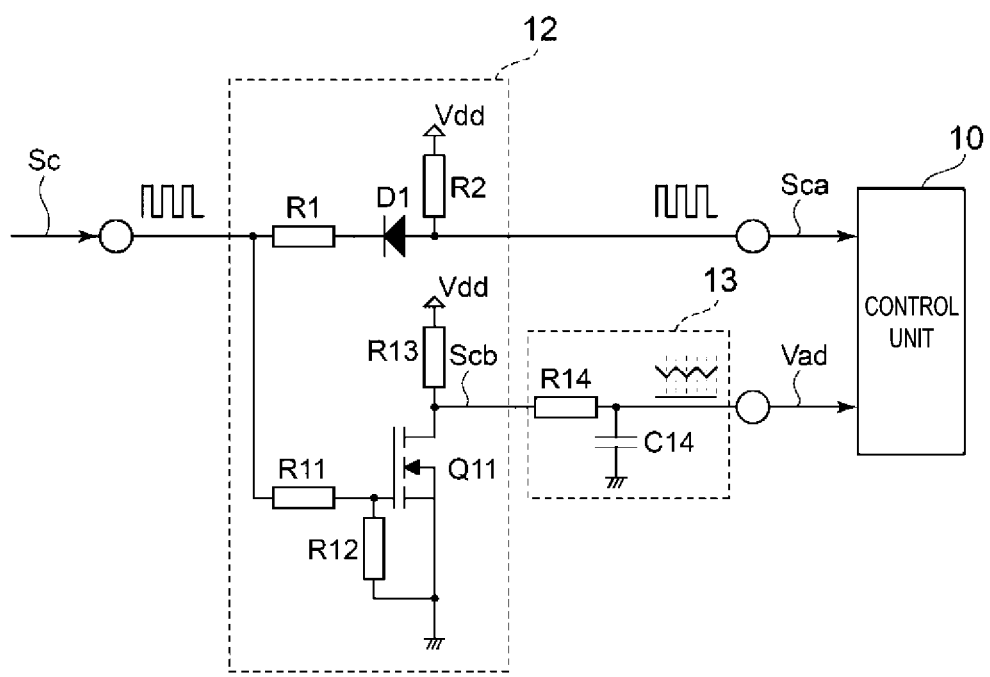
FIG. 2A is a diagram illustrating an example of a circuit configuration of a PWM input circuit and a smoothing circuit.

FIG. 2A is a diagram illustrating an example of circuit configurations of the PWM input circuit 12 and the smoothing circuit 13.

The PWM input circuit 12 is a level shift circuit configured such that the PWM signal Sc at a predetermined voltage level inputted from the upper layer device 3 is converted into a voltage level (from 0 to Vdd) that the MCU serving as the control unit 10 can accept. For example, in a case where the speed instruction signal Sc is a signal that specifies a duty cycle (as rotational speed) on the basis of the length of the high level period, the PWM input circuit 12 outputs a PWM signal Sca obtained by converting the voltage level of the PWM signal Sc, and also outputs a PWM signal Scb obtained by converting the voltage level of the PWM signal Sc and inverting the logical level. The PWM signal Sca is inputted into the control unit 10.

The smoothing circuit 13 is a low-pass filter. For example, the smoothing circuit 13 is a CR low-pass filter including a capacitor C14 and a resistance R14. The smoothing circuit 13 smooths the PWM signal Scb, of which voltage level has been converted by the PWM input circuit 12 and of which logical level has been inverted, and outputs it. The smoothed voltage Vad smoothed by the smoothing circuit 13 is inputted into the control unit 10.

Figure 3A:
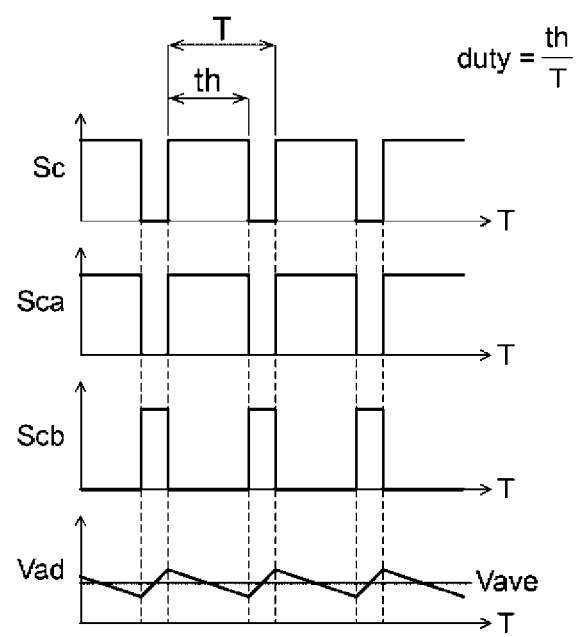
FIG. 3A is a timing chart showing one example of signals of the PWM input circuit and the smoothing circuit illustrated in FIG. 2A.

FIG. 3A is a timing chart showing one example of signals of the PWM input circuit 12 and the smoothing circuit 13 illustrated in FIG. 2A. FIG. 3A illustrates a PWM signal Sca or the like in a case where a PWM signal Sc having a duty cycle equal to or more than 50% is inputted. In a case of FIG. 3A, a PWM signal Sca having a logical level equal to the PWM signal Sc is generated, and a smoothed voltage Vad (pulsating voltage) having an average value Vave corresponding to the duty cycle of the PWM signal Sc is generated.

Figure 2B:
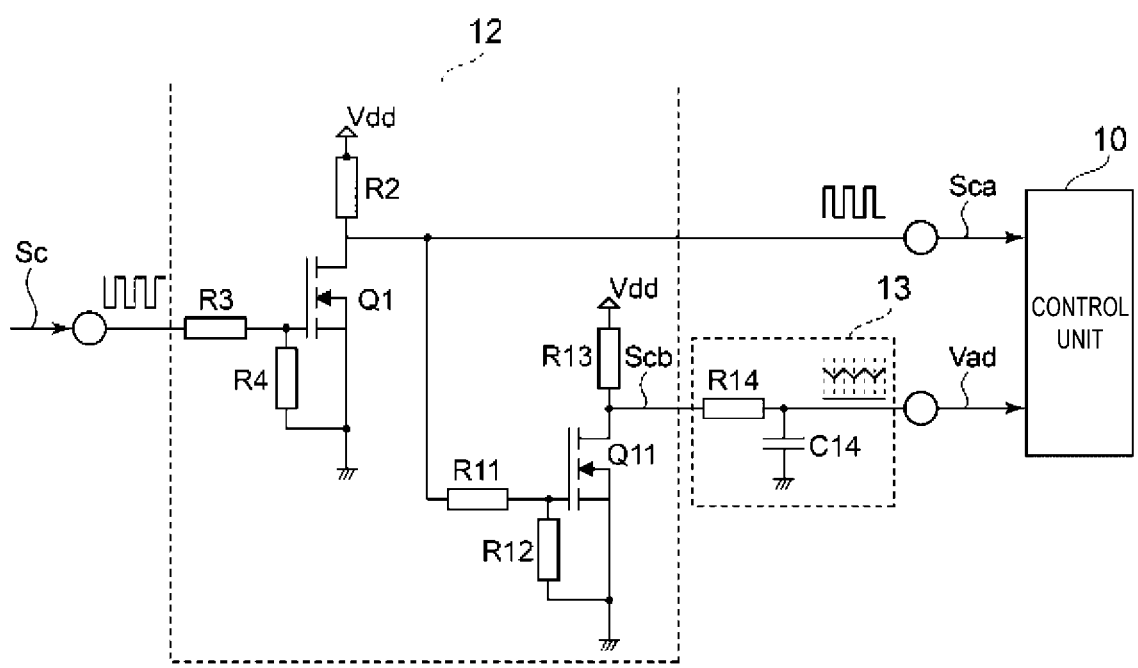
FIG. 2B is a diagram illustrating another example of a circuit configuration of a PWM input circuit and a smoothing circuit.

Note that, in a case where the speed instruction signal Sc is a signal used to specify a duty cycle (as rotational speed) on the basis of the length of a low level period, it may be possible to employ the PWM input circuit 12 having a circuit configuration illustrated in FIG. 2B. In addition, the logical level may be inverted in the MCU.

FIG. 2B is a diagram illustrating another example of circuit configurations of the PWM input circuit 12 and the smoothing circuit 13.

The PWM input circuit 12 illustrated in FIG. 2B outputs the PWM signal Sca obtained by converting the voltage level of the PWM signal Sc and inverting the logical level, and also outputs a PWM signal Scb obtained by converting a voltage level of the PWM signal Sc. The smoothing circuit 13 smooths the PWM signal Scb of which voltage level has been converted by the PWM input circuit 12, and outputs it.

Figure 3B:
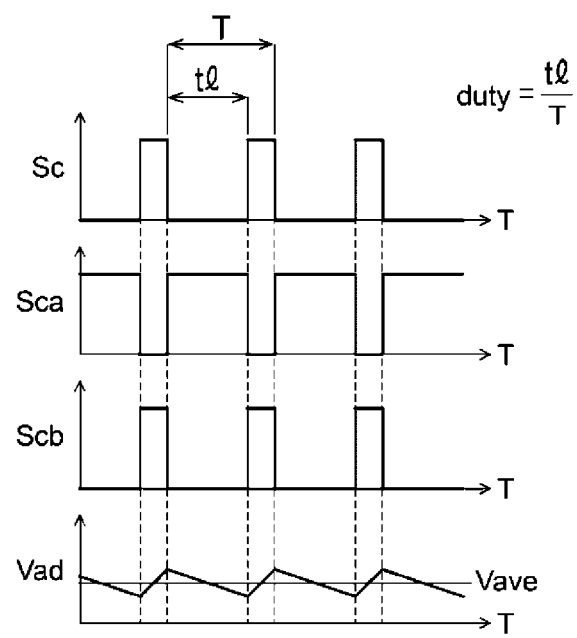
FIG. 3B is a timing chart showing one example of signals of the PWM input circuit and the smoothing circuit illustrated in FIG. 2B.

FIG. 3B is a timing chart showing one example of signals of the PWM input circuit 12 and the smoothing circuit 13 illustrated in FIG. 2B. FIG. 3B illustrates a PWM signal Sca or the like in a case where a PWM signal Sc having a duty cycle equal to or more than 50% is inputted. In a case of FIG. 3B, a PWM signal Sca obtained by inverting the logical level of the PWM signal Sc is generated, and a smoothed voltage Vad (pulsating voltage) having an average value Vave corresponding to the duty cycle of the PWM signal Sc is generated.

The control unit 10 measures a duty cycle of a speed instruction signal (PWM signal) Sc on the basis of the PWM signal Sca inputted from the PWM input circuit 12 and the smoothed voltage Vad inputted from the smoothing circuit 13, and generates a control signal Sd so that the motor 2 rotates at a rotational speed corresponding to the measured duty cycle.

Figure 4:
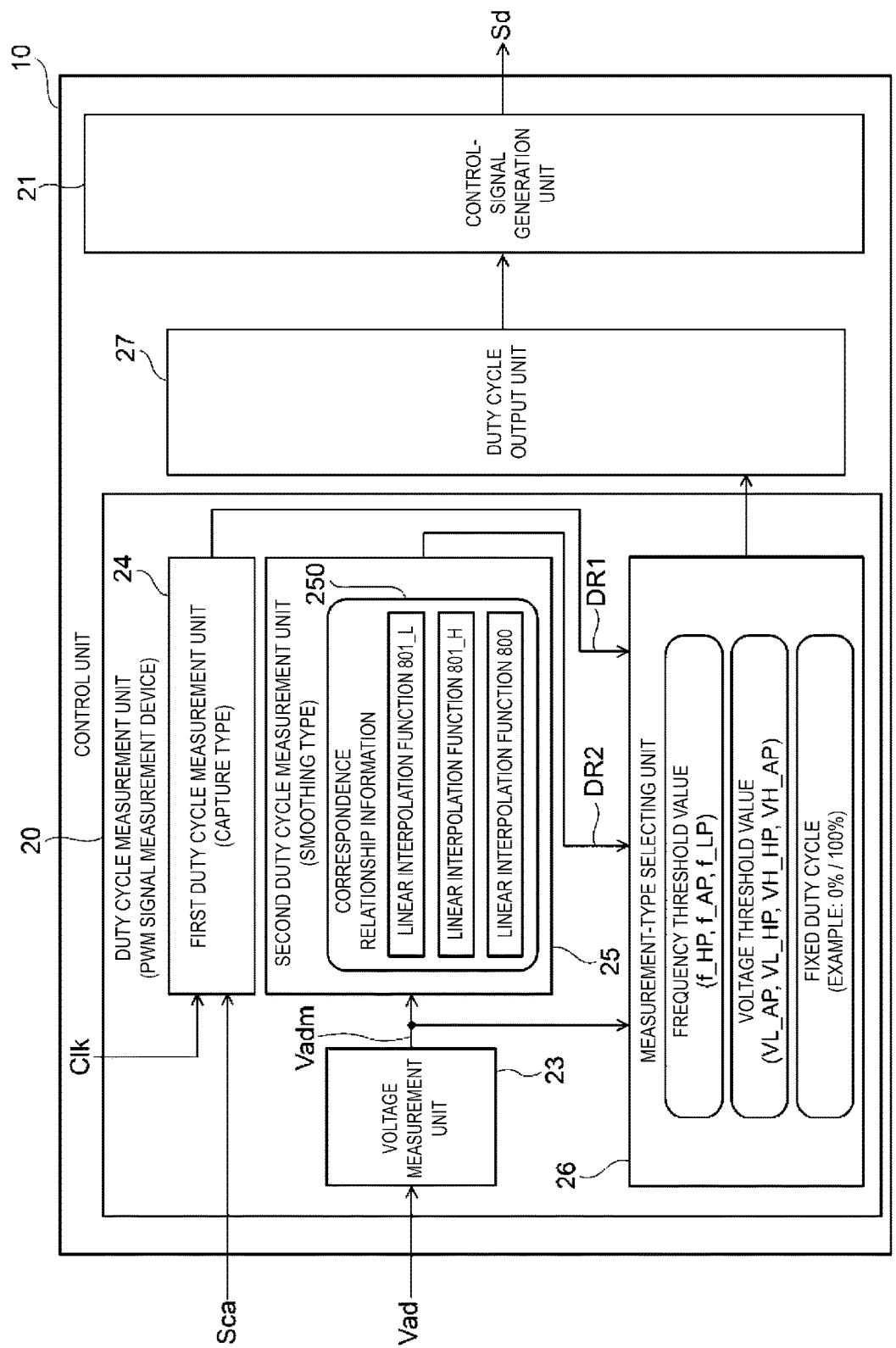
FIG. 4 is a functional block diagram illustrating a control unit of the motor drive control device according to the first embodiment.

FIG. 4 is a functional block diagram illustrating the control unit 10.

As illustrated in FIG. 4, the control unit 10 includes: a duty cycle measurement unit 20 (one example of a PWM signal measurement device) configured to measure a frequency and a duty cycle on the basis of an edge of the PWM signal Sca serving as a PWM signal to measure a duty cycle on the basis of the smoothed voltage Vad of the PWM signal; a duty cycle output unit 27 configured to adjust the duty cycle measured by the duty cycle measurement unit 20 so as to match a drive state of the motor, and output it; and a control-signal generation unit 21 configured to generate a control signal Sd on the basis of the outputted duty cycle.

The control-signal generation unit 21 generates a control signal Sd used to control drive of the motor 2 on the basis of the duty cycle outputted from the duty cycle output unit 27. The control-signal generation unit 21 outputs, as the control signal Sd, a PWM signal having, for example, a PWM cycle of 20 kHz.

For example, in the MCU constituting the control unit 10 described above, the processor 101 executes various types of operations in accordance with programs stored in a storage device such as the RAM 103 or the ROM 102, and also controls peripheral circuits such as the timer (counter) 104, the A-D conversion circuit 105, and the input-output I/F circuit 107, thereby implementing the control-signal generation unit 21.

The duty cycle measurement unit 20 employs both a capture type and a smoothing type as a duty cycle measurement type used to measure a duty cycle, thereby measuring a duty cycle of the PWM signal Sc. Specifically, the duty cycle measurement unit 20 selects one of the capture type or the smoothing type as a measurement type for a duty cycle, on the basis of a measured value of the smoothed voltage Vad obtained by smoothing the PWM signal Sc with the smoothing circuit 13 and a measured value of a frequency f (or a cycle T) of the PWM signal Sc. In addition, the duty cycle measurement unit 20 sets the duty cycle calculated using the selected measurement type, as the measured value of the duty cycle of the PWM signal Sc.

More specifically, the duty cycle measurement unit 20 sets a plurality of classification regions for which classification is made on the basis of a threshold value concerning a frequency of the PWM signal Sc and a threshold value concerning a voltage obtained by smoothing the PWM signal Sc, and assigns at least one of the capture type or the smoothing type as the duty cycle measurement type, to each of the classification regions. The duty cycle measurement unit 20 specifies the classification region on the basis of a measured value of the smoothed voltage Vad and a measured value of a frequency f (or a cycle T) of the PWM signal Sc, and selects a measurement type for a duty cycle assigned to the specified classification region to set a duty cycle calculated using the selected measurement type, as the measured value of the duty cycle of the PWM signal Sc.

The capture type and the smoothing type will be described in detail before detailed description of a method of measuring a duty cycle by the duty cycle measurement unit 20.

First, the capture type will be described.

Figure 5A:
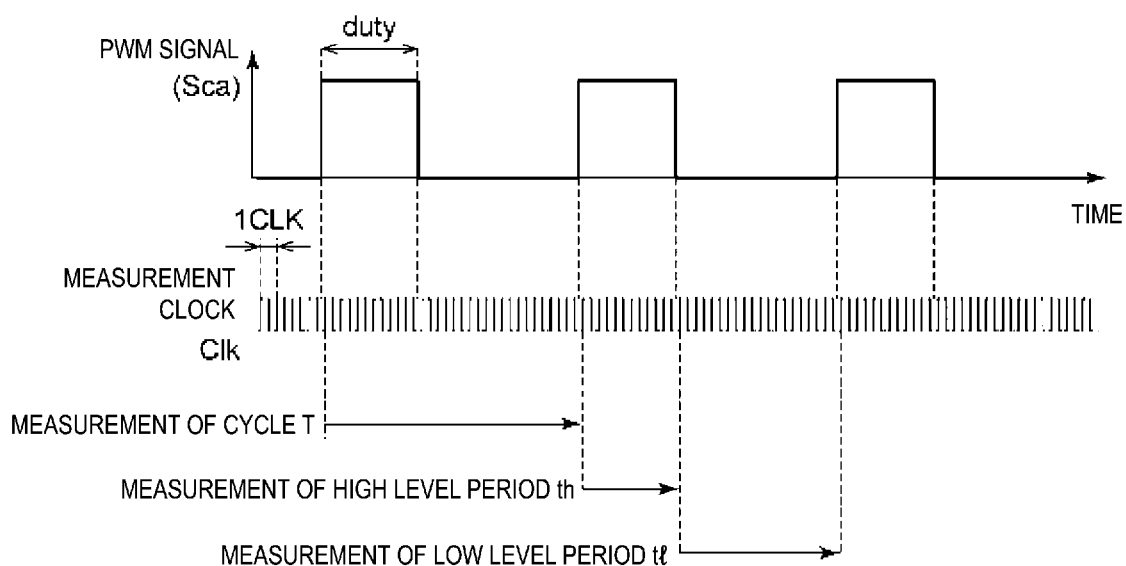
FIG. 5A is a diagram illustrating an outline of a method of measuring a duty cycle of a PWM signal using a capture type.

FIG. 5A is a diagram illustrating an outline of the method of measuring a duty cycle of a PWM signal using the capture type.

As illustrated in FIG. 5A, the capture type measures a PWM signal using a measurement clock Clk having a frequency higher than the PWM signal serving as the measurement target. Specifically, a period of time between edges is measured using the measurement clock Clk on the basis of edges (rising edges and falling edges) of the PWM signal. This makes it possible to measure a high level period th in which the PWM signal is at a high level, a low level period t1 in which the PWM signal is at a low level, and a cycle T of the PWM signal. By using these measured values, it is possible to calculate a duty cycle serving as the measured value of the duty cycle.

For example, in a case where a duty cycle of the PWM signal is measured with the capture type using a MCU including one timer, it is not possible to measure the cycle T of the PWM signal, the high level period th, and the low level period t1 at the same time. For this reason, as illustrated in FIG. 5A, the cycle T, the high level period th, and the low level period t1 are sequentially measured using edges of three pulses (PWM signal). As edges of the PWM signal and the measurement clock are less likely to be synchronized, there is a possibility that the sum of the measured high level period th and the measured low level period t1 is not equal to the measured cycle T, and measured values of the calculated duty cycle vary. In addition, when the PWM signal serving as the measurement target has a duty cycle at or around 50%, a measured value of the calculated duty cycle may vary in a case of a type using only a smaller one (greater one) of the high level period th or the low level period t1. Furthermore, when the PWM signal serving as the measurement target has a duty cycle at or around 0% or at or around 100%, a measured value of the calculated duty cycle may vary in a case of a type using only one of the high level period th or the low level period t1.

Figure 5B:
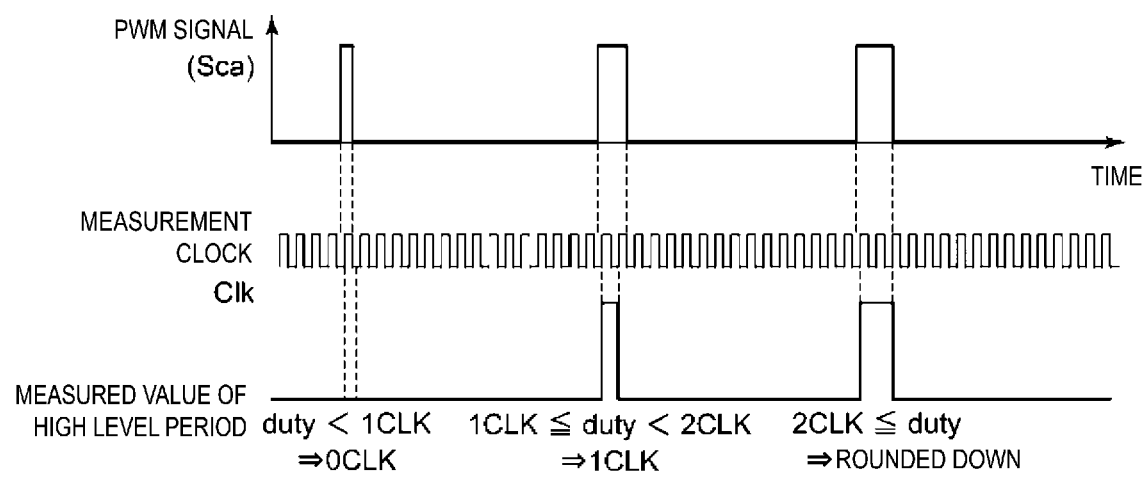
FIG. 5B is a diagram illustrating an outline of a case where a PWM signal having a duty cycle at or around 0% is measured using the capture type.

FIG. 5B is a diagram illustrating an outline in a case where a PWM signal having a duty cycle at or around 0% is measured using the capture type.

As illustrated in FIG. 5B, with the capture type, the duty cycle of the PWM signal cannot be measured in a case where the high level period th of the PWM signal is shorter than one cycle (1CLK) of the measurement clock Clk (th<1CLK). In addition, depending on the performance of the MCU, the MCU fails to read a change of edges, and variation of the measured value of the duty cycle may increase in a case where the high level period th of the PWM signal is not less than one cycle (1CLK) and less than two cycles (2CLK) of the measurement clock Clk. Furthermore, in a case of n×CLK≤th<(n+1)×CLK (n is an integer equal to or more than 2), the number of measured clocks is rounded down to be th=n×CLK.

The maximum value (minimum value of the cycle) of a frequency of the PWM signal at which the capture type can measure a duty cycle is restricted by the minimum resolution of a duty cycle of the PWM signal. For example, in a case where the minimum resolution is set to 1/64 (=1.5625%) when the frequency of the measurement clock Clk is 8192 kHz (1CLK=122 ns), a frequency greater than 128 kHz (=8192000/64) cannot satisfy the resolution. Furthermore, at this time, measurement cannot be performed for the PWM signal having a duty cycle less than 1.5625% or more than 98.4375%.

On the other hand, the minimum value (maximum value of the cycle) of a frequency of the PWM signal at which the capture type can measure a duty cycle is restricted by the upper limit value counted by the timer (counter) 104 of the MCU. For example, in a case where the timer (counter) 104 is a 16-bit counter, measurement cannot be performed for the PWM signal having a frequency equal to or less than 125 Hz (=8192000/65536).

In this manner, in a case of the capture type, as the frequency of the PWM signal increases, the resolution based on the measurement clock Clk reduces. In addition, the duty cycle of the PWM signal cannot be accurately measured in a case where the duty cycle of the PWM signal is at or around 0%, 50%, or 100%.

Next, the smoothing type will be described.

Figure 6A:
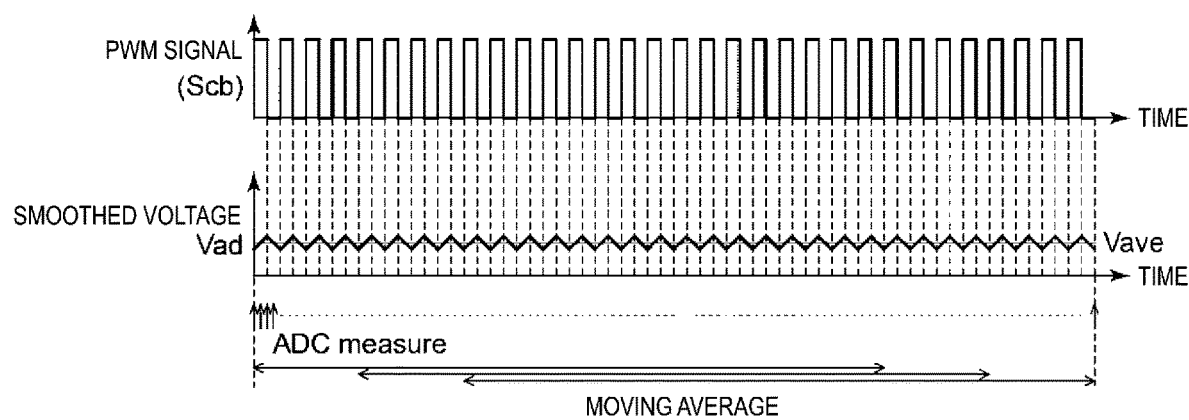
FIG. 6A is a diagram illustrating an outline of a method of measuring a duty cycle of a PWM signal having a high frequency (short cycle) using a smoothing type.
Figure 6B:
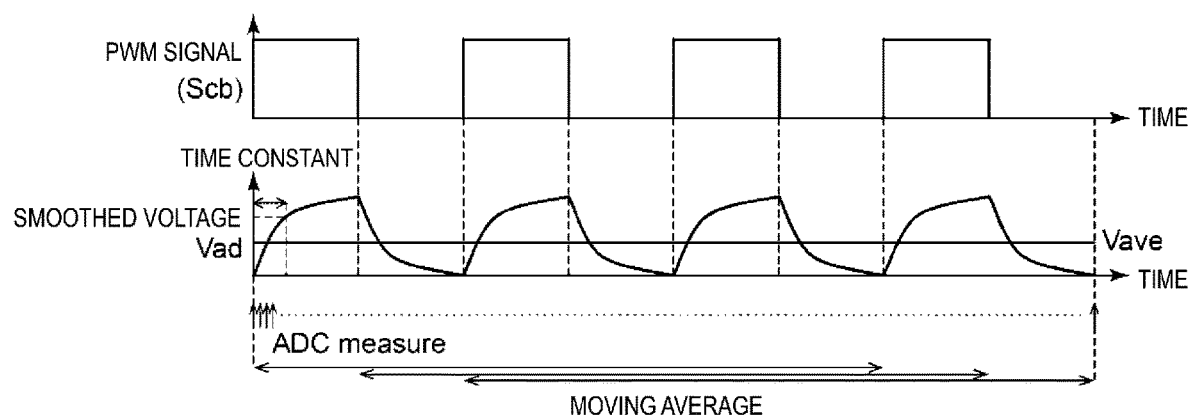
FIG. 6B is a diagram illustrating an outline of a method of measuring a duty cycle of a PWM signal having a low frequency (long cycle) using the smoothing type.

FIGS. 6A and 6B are diagrams each illustrating an outline of a method of measuring a duty cycle of the PWM signal Scb using the smoothing type. FIG. 6A is a diagram illustrating an outline of a method of measuring a duty cycle of a PWM signal having a high frequency (short cycle) by using the smoothing type. FIG. 6B is a diagram illustrating an outline of a method of measuring a duty cycle of a PWM signal having a low frequency (long cycle) by using the smoothing type.

As illustrated in FIGS. 6A and 6B, in a case of the smoothing type, a duty cycle of the PWM signal Scb is measured on the basis of the smoothed voltage Vad obtained by using a low-pass filter (smoothing circuit 13) to smooth the PWM signal Scb serving as the measurement target. Specifically, A-D conversion is performed at a certain cycle of the smoothed voltage Vad to calculate an average value (for example, moving average) of results of the A-D conversion, and the thus obtained value is set as the measured value of the smoothed voltage Vad. In addition, correspondence relationship information between the measured value and the duty cycle of the smoothed voltage Vad has been set in advance, and on the basis of the correspondence relationship information, it is possible to calculate a duty cycle from the measured values of the smoothed voltage Vad to set it as the measured value of the duty cycle.

Figure 7:
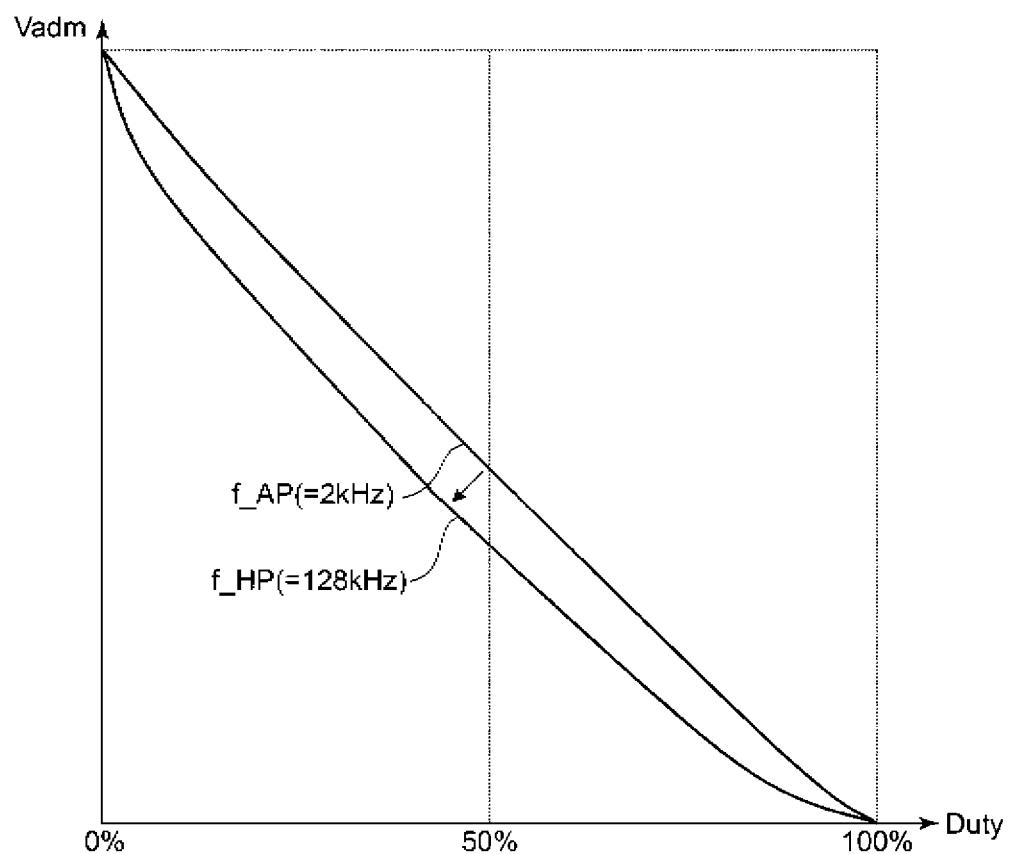
FIG. 7 is a diagram illustrating a relationship between a measured voltage value Vadm of a smoothed voltage Vad of a PWM signal and a duty cycle of the PWM signal.

FIG. 7 is a diagram illustrating a relationship between a measured value of the smoothed voltage Vad of the PWM signal Scb and a duty cycle of the PWM signal Scb.

In FIG. 7, the horizontal axis indicates a duty cycle of the PWM signal Scb, and the vertical axis indicates a measured value (hereinafter, also referred to as a "measured voltage value Vadm") of the smoothed voltage Vad obtained by smoothing the PWM signal Scb. In the smoothing type, correspondence relationship information between the measured voltage value Vadm and the duty cycle as illustrated in FIG. 7 is prepared in advance, and a duty cycle is calculated on the basis of the correspondence relationship information and an actually measured voltage value.

In a case of the smoothing type, a change in the smoothed voltage Vad relative to time reduces as illustrated in FIG. 6A in a case where a frequency f of the PWM signal Sc is sufficiently higher (f>>fc) than a cut-off frequency fc based on a time constant (τ=C14×R14) of the low-pass filter (smoothing circuit 13). On the other hand, in a case where the frequency f of the PWM signal Sc gets closer to the cut-off frequency fc (f>fc), a change in the smoothed voltage Vad relative to time increases as illustrated in FIG. 6B.

Typically, in the smoothing type, the time constant τ of the low-pass filter (smoothing circuit 13), the A-D conversion cycle, and the moving average period depend on a system configuration. Thus, as illustrated in FIGS. 6A and 6B, if variation in the smoothed voltage Vad increases to a degree that the frequency of the PWM signal reduces, variation in the measured value (moving average) of the smoothed voltage Vad increases, and variation in the measured value of the duty cycle of the PWM signal increases.

In addition, the duty cycle of the PWM signal and the measured voltage value are substantially proportional to each other as illustrated in FIG. 7. However, as the frequency of the PWM signal increases, the linearity of the duty cycle relative to the measured voltage value gets deteriorated. In particular, deviation from the linearity is the maximum in a case where the duty cycle is at or around 50%, and variation in the measured value of the duty cycle calculated on the basis of the measured voltage value Vadm increases.

Details of each of the measurement types described above can be summarized in the following manner.

That is, in a case of the capture type, the accuracy of measurement of the duty cycle tends to deteriorate with increase in the frequency of the PWM signal serving as the measurement target. In a case of the smoothing type, it is not possible to measure the duty cycle of the PWM signal having a frequency lower than the cut-off frequency fc of the low-pass filter, and the accuracy of measurement of the duty cycle tends to deteriorate with decrease in a frequency of the PWM signal (as the frequency gets closer to the cut-off frequency fc). In addition, in a case of the smoothing type, as the frequency of the PWM signal increases, variation in the measure values of the duty cycle calculated at the duty cycle at or around 50% increases.

For this reason, the duty cycle measurement unit 20 (PWM signal measurement device) switches the capture type and the smoothing type on an as-necessary basis and measures a duty cycle of the PWM signal Sc serving as a speed instruction signal so as to make up for the drawbacks described above of the capture type and the smoothing type. Below, the duty cycle measurement unit 20 will be specifically described.

As illustrated in FIG. 4, the duty cycle measurement unit 20 includes a voltage measurement unit 23, a first duty cycle measurement unit 24, a second duty cycle measurement unit 25, and a measurement-type selecting unit 26, which are functional units used to measure a duty cycle of the PWM signal Sca.

The voltage measurement unit 23 is a functional unit used to measure the smoothed voltage Vad outputted from the smoothing circuit 13. The voltage measurement unit 23 is implemented by, for example, program processing performed by the A-D conversion circuit 105 and the processor 101.

The voltage measurement unit 23 applies A-D conversion to the smoothed voltage Vad at a predetermined cycle to convert it into a digital value. The voltage measurement unit 23 calculates an average value (for example, moving average) of the A-D converted values of the smoothed voltage Vad for each certain period of time. The voltage measurement unit 23 outputs the average value of the calculated A-D converted values, as a measured value (measured voltage value) Vadm of the smoothed voltage of the PWM signal Sc.

The first duty cycle measurement unit 24 is a functional unit used to measure a duty cycle of the PWM signal Sc using the capture type described above. The first duty cycle measurement unit 24 is implemented by, for example, program processing performed by the timer (counter) 104 and the processor 101. The first duty cycle measurement unit 24 uses the measurement clock Clk to measure a period based on an edge of the PWM signal Sc (PWM signal Sca), and measures a frequency f and a duty cycle DR1 of the PWM signal Sc on the basis of the measured value of the period described above.

Here, the measurement clock Clk is generated, for example, by the clock generation circuit 108 of the MCU constituting the control unit 10.

The first duty cycle measurement unit 24 uses a measurement method of the capture type described above to use the measurement clock Clk to measure the cycle T, the high level period th, and the low level period t1 of the PWM signal Sca outputted from the PWM input circuit 12, and calculates the duty cycle DR1 of the PWM signal Sc on the basis of measured values of these parameters (see FIG. 5).

The second duty cycle measurement unit 25 is a functional unit used to measure the duty cycle of the PWM signal Sc using the smoothing type described above. The second duty cycle measurement unit 25 is implemented by, for example, program processing performed by the processor 101.

The second duty cycle measurement unit 25 measures a duty cycle of the PWM signal Sc on the basis of the measured value (measured voltage value Vadm) of the smoothed voltage Vad measured by the voltage measurement unit 23. Specifically, the second duty cycle measurement unit 25 calculates a duty cycle DR2 of the PWM signal Sc on the basis of correspondence relationship information 250 concerning the measured voltage value Vadm and the duty cycle of the PWM signal. The correspondence relationship information 250 has been stored in advance, for example, in a storage device such as the ROM 102 of the MCU.

Figure 8:
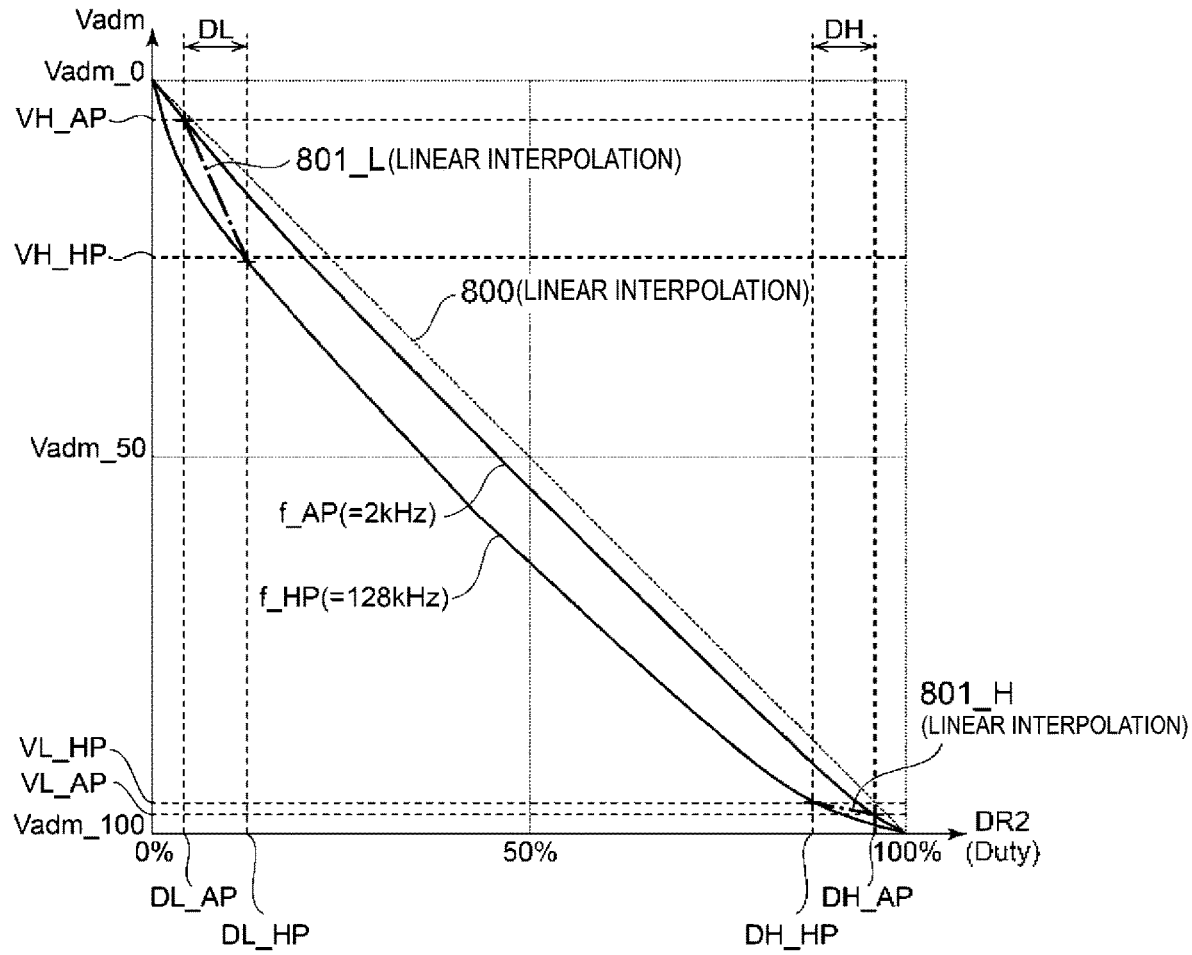
FIG. 8 is a diagram used to explain correspondence relationship information between a measured voltage value Vadm and a duty cycle of a PWM signal in the motor drive control device according to the first embodiment.

FIG. 8 is a diagram used to explain the correspondence relationship information 250 concerning the measured voltage value Vadm and the duty cycle of the PWM signal in the motor drive control device according to the first embodiment.

As described above, a voltage obtained by smoothing the PWM signal and the duty cycle are substantially proportional to each other. Thus, a linear interpolation function 800 expressing a relationship between the measured voltage value Vadm and the duty cycle as a linear function is calculated in advance on the basis a measured value of the duty cycle and a measured value (measured voltage value Vadm) of the smoothed voltage Vad in a case where the PWM signal has been actually smoothed using the smoothing circuit 13 (low-pass filter), and is stored in advance as the correspondence relationship information 250 in a storage device such as the ROM 102 of the MCU.

On the other hand, the more the frequency of the PWM signal increases, the more the correspondent relationship between the measured voltage value Vadm and the duty cycle deviates from the linearity, as illustrated in FIG. 8. Thus, apart from the linear interpolation function 800, a linear interpolation function 801_L expressing a relationship between the measured voltage value Vadm and the duty cycle as a linear function is calculated for a range DL on the low duty side in FIG. 8, that is, for a range in which the measured voltage value Vadm falls in a range from a second low duty side voltage VH_HP that will be described later to a first low duty side voltage VH_AP, and is stored in advance as the correspondence relationship information 250 in a storage device such as the ROM 102 of the MCU.

Similarly, apart from the linear interpolation function 800, a linear interpolation function 801_H expressing a relationship between the measured voltage value Vadm and the duty cycle as a linear function is calculated for a range DH on the high duty side in FIG. 8, that is, in a case where the measured voltage value Vadm falls in a range from a first high duty side voltage VL_AP to a second high duty side voltage VL_HP, and is stored in advance as the correspondence relationship information 250 in a storage device such as the ROM 102 in the MCU.

The second duty cycle measurement unit 25 uses the linear interpolation functions 800, 801_H, 801_L stored in the storage device such as the ROM 102 to calculate the duty cycle DR2 corresponding to the measured voltage value Vadm acquired from the voltage measurement unit 23. That is, the second duty cycle measurement unit 25 calculates the duty cycle DR2 corresponding to the measured voltage value Vadm by using the linear interpolation function 801_H for a range of VL_AP≤Vadm<VL_HP, using the linear interpolation function 801_L for a range of VH_HP<Vadm≤VH_AP, and using the linear interpolation function 800 for a range of VL_HP≤Vadm≤VH_HP.

Note that description will be made later of the first low duty side voltage VH_AP, the first high duty side voltage VL_AP, the second low duty side voltage VH_HP, and the second high duty side voltage VL_HP.

The duty cycle output unit 27 is a functional unit configured to adjust a measured value of the duty cycle or a fixed duty cycle corresponding to the measurement type selected by the duty cycle measurement unit 20 (measurement-type selecting unit 26), so as to match a drive state of the motor, and output it. The duty cycle output unit 27 is implemented by, for example, program processing performed by the processor 101.

For example, the duty cycle output unit 27 outputs the measured value (DR1) of the duty cycle by the first duty cycle measurement unit 24 or the measured value (DR2) of the duty cycle by the second duty cycle measurement unit 25 or the fixed duty cycle, in response to output from the duty cycle measurement unit 20.

In addition, for example, at the time of activating the motor unit 100, the duty cycle output unit 27 temporarily outputs a high duty cycle. Furthermore, for example, in a case where the measured value of the duty cycle largely changes for a very short period of time, the duty cycle output unit 27 gradually changes and outputs the duty cycle, rather than rapidly changing the duty cycle to be outputted.

In addition, for example, in a case where the control unit 10 detects an abnormal state such as low voltage or excess voltage at the motor unit 100 or lock of the motor 2, the duty cycle output unit 27 stops outputting of the duty cycle.

The measurement-type selecting unit 26 is a functional unit configured to select either the capture type or the smoothing type as the measurement type for measuring a duty cycle of the PWM signal Sc. The measurement-type selecting unit 26 is implemented by, for example, program processing performed by the processor 101.

On the basis of the measured voltage value Vadm and a measured value of the frequency f (or cycle T) of the PWM signal Sc, the measurement-type selecting unit 26 selects a measurement type for the duty cycle assigned to each of a plurality of classification regions for which classification is made on the basis of a threshold value concerning a frequency of the PWM signal Sc and a threshold value concerning a voltage obtained by smoothing the PWM signal Sc.

Figure 9:
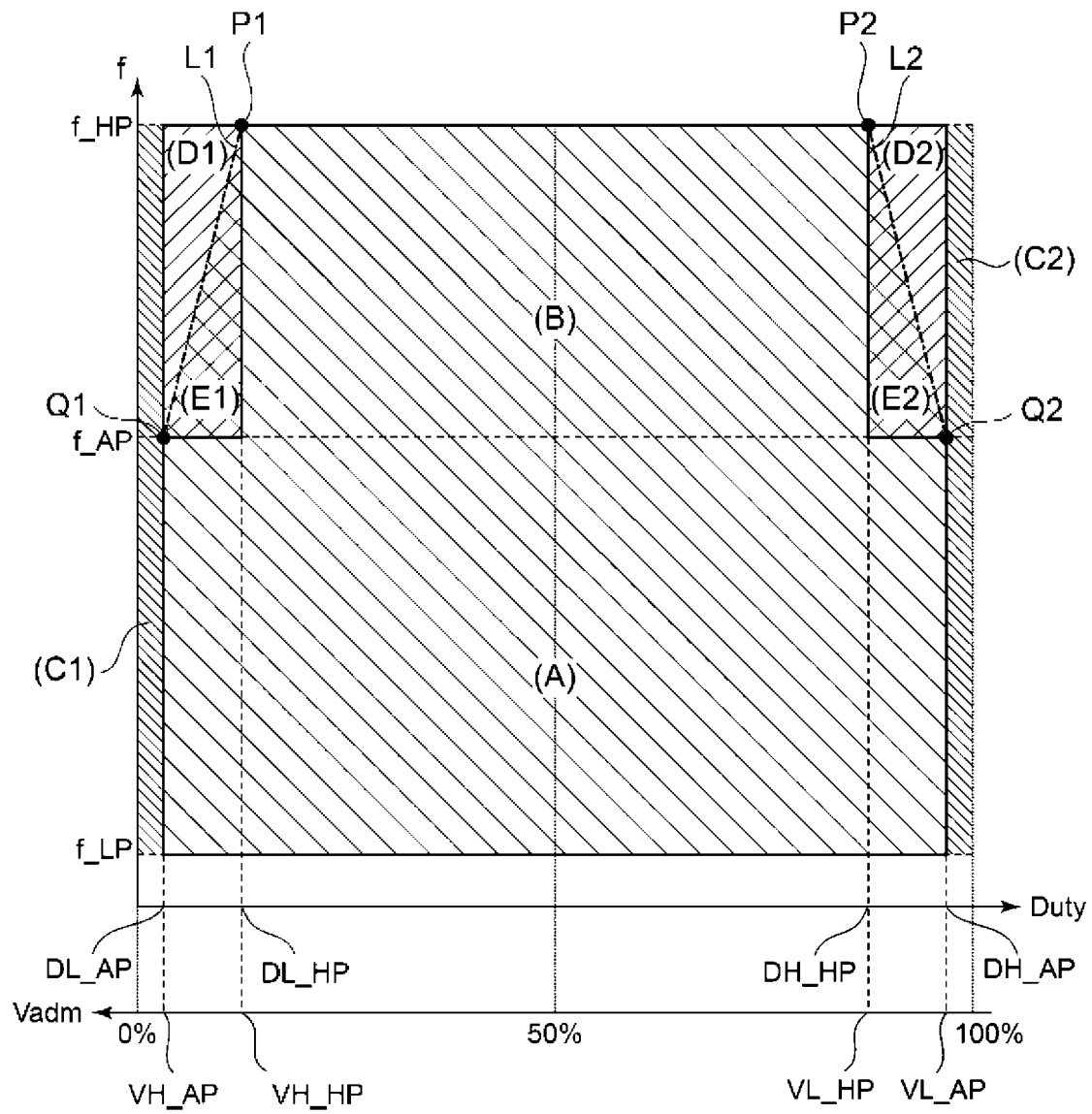
FIG. 9 is a diagram used to explain a method of selecting a measurement type for a duty cycle of a PWM signal in the motor drive control device according to the first embodiment.

FIG. 9 is a diagram used to explain a method of selecting a measurement type for a duty cycle of the PWM signal in the motor drive control device according to the first embodiment.

In the same diagram, the vertical axis indicates a frequency f of the PWM signal Sc (Sca), and the horizontal axis indicates a duty cycle of the PWM signal Sc. On the basis of the relationship between the measured voltage value Vadm and the duty cycle illustrated in FIG. 8, the duty cycle indicated on the horizontal axis can be read as the measured voltage value Vadm. Thus, on the horizontal axis of FIG. 9, the measured voltage values Vadm are also indicated in parallel to the duty cycle. In addition, values of the measured voltage values Vadm corresponding to duty cycles are illustrated.

FIG. 9 illustrates a plurality of classification regions A, B, C1, C2, D1, D2, E1, E2 for which classification is made on the basis of a threshold value concerning a frequency of the PWM signal Sc and a threshold value concerning a voltage obtained by smoothing the PWM signal Sc.

Here, the threshold value concerning a frequency of the PWM signal Sc includes an upper limit frequency f_HP, a smoothing-possible frequency f_AP, and a lower limit frequency f_LP.

The upper limit frequency f_HP is a threshold value defining the upper limit of a frequency f of the PWM signal at which a duty cycle can be measured with the capture type. The lower limit frequency f_LP is a threshold value defining the lower limit a frequency f of the PWM signal at which a duty cycle can be measured with the capture type.

As described above, the maximum value (minimum value of the cycle T) of a frequency f of the PWM signal Sc at which the capture type can measure a duty cycle is restricted by the minimum resolution of a duty cycle of the PWM signal Sc. In addition, the minimum value (maximum value of the cycle T) of a frequency f of the PWM signal Sc at which the capture type can measure a duty cycle is restricted by the upper limit value counted by the timer (counter) 104 of the MCU.

Thus, for example, the upper limit frequency f_HP and the lower limit frequency f_LP are decided, for example, by reflecting the resolution of the first duty cycle measurement unit 24 measuring the duty cycle using the capture type and also reflecting the degree of variations in measured values when the first duty cycle measurement unit 24 actually measures the cycle T, the high level period th, and the low level period t1. These frequencies are stored in advance in the storage device such as the ROM 102 of the MCU.

In the present embodiment, the upper limit frequency f_HP is set to 128 kHz, and the lower limit frequency is set to 250 Hz, by way of example.

The smoothing-possible frequency f_AP is a threshold value falling in a range between the upper limit frequency f_HP and the lower limit frequency f_LP and defining a frequency f of the PWM signal at which the smoothing type can measure the duty cycle, and is a threshold value serving as a reference for determining whether the PWM signal serving as the measurement target can be smoothed.

As described above, the smoothing circuit 13 is comprised of a low-pass filter, and hence, cannot smooth a PWM signal having a frequency lower than the cut-off frequency fc of the low-pass filter. Thus, the smoothing-possible frequency f_AP is decided on the basis of a time constant $\tau(=R14 \times C14)$ of the smoothing circuit 13, variations in measured values of the smoothed voltage Vad by the voltage measurement unit 23, or the like. The smoothing-possible frequency f_AP is stored in advance in the storage device such as the ROM 102 of the MCU.

In the present embodiment, the smoothing-possible frequency f_AP is set to 2 kHz, by way of example.

The threshold value concerning a voltage obtained by smoothing the PWM signal Sc includes the first low duty side voltage VH_AP, the first high duty side voltage VL_AP, the second low duty side voltage VH_HP, and the second high duty side voltage VL_HP.

As illustrated in FIG. 8, the first low duty side voltage VH_AP, the first high duty side voltage VL_AP, the second low duty side voltage VH_HP, and the second high duty side voltage VL_HP are voltages corresponding to the duty cycles DL_AP, DH_AP, DL_HP, and DH_HP, respectively. As described above, the correspondent relationship between the duty cycle and the smoothed voltage is based on measured values.

The first low duty side voltage VH_AP is a voltage corresponding to a minimum duty cycle DL_AP of a pulse having the smoothing-possible frequency f_AP. The first low duty side voltage VH_AP expresses a smoothed voltage Vad (measured voltage value Vadm) corresponding to the minimum duty cycle (DL_AP) and concerning a PWM signal Sca having a high level period corresponding to one cycle (1CLK) of the measurement clock Clk and also having a frequency being the smoothing-possible frequency f_AP (2 kHz) (see FIG. 5B). For example, in a case where the smoothing-possible frequency f_AP is set to 2 kHz and the frequency of the measurement clock is set to 8192 kHz, the minimum duty cycle DL_AP is 0.024%.

The first high duty side voltage VL_AP is a voltage corresponding to a maximum duty cycle DH_AP of a pulse having the smoothing-possible frequency f_AP. The first high duty side voltage VL_AP expresses a smoothed voltage Vad (measured voltage value Vadm) corresponding to the maximum duty cycle (DH_AP) and concerning a PWM signal Sca having a low level period corresponding to one cycle (1CLK) of the measurement clock Clk and also having a frequency being the smoothing-possible frequency f_AP (2 kHz). For example, in a case where the smoothing-possible frequency f_AP is set to 2 kHz and the frequency of the measurement clock is set to 8192 kHz, the maximum duty cycle DH_AP is 99.976%.

The second low duty side voltage VH_HP is a voltage corresponding to the minimum duty cycle DL_HP of a pulse having the upper limit frequency f_HP. In the example of FIG. 5B described above, the second low duty side voltage VH_HP is a voltage corresponding to the minimum duty cycle (DL_HP) and concerning a pulse having a frequency being the upper limit frequency f_HP (128 kHz) and also having a high level period corresponding to one cycle (1CLK) of the measurement clock Clk (see FIG. 5B). For example, in a case where the upper limit frequency f_HP is equal to 128 kHz and the frequency of the measurement clock is set to 8192 kHz, the minimum duty cycle DL_HP is 1.5625%.

The second high duty side voltage VL_HP is a voltage corresponding to the maximum duty cycle DH_HP of a pulse having the smoothing-possible frequency f_AP. In the example of FIG. 5B described above, the second high duty side voltage VL_HP is a voltage corresponding to the maximum duty cycle (DH_HP) and concerning a pulse having a frequency being the upper limit frequency f_HP (128 kHz) and also having a low level period corresponding to one cycle (1CLK) of the measurement clock Clk. For example, in a case where the upper limit frequency f_HP is equal to 128 kHz and the frequency of the measurement clock is set to 8192 kHz, the maximum duty cycle DH_HP is 98.4375%.

As illustrated in FIG. 9, each of the classification regions A, B, C1, C2, D1, D2, E1, and E2 is set on the basis of a threshold value (f_HP, f_AP, and f_LP) concerning a frequency of the PWM signal Sc described above and a threshold value (VL_AP, VH_AP, VL_HP, and VH_HP) concerning a voltage obtained by smoothing the PWM signal Sc. Below, each of the classification regions will be described.

The classification region A is a region that the frequency f of the PWM signal Sc is not more than the smoothing-possible frequency f_AP (2 kHz). More specifically, the classification region A is a region surrounded by the smoothing-possible frequency f_AP, the first low duty side voltage VH_AP, the first high duty side voltage VL_AP, and the lower limit frequency f_LP.

The classification region B is a region surrounded by the smoothing-possible frequency f_AP, the second low duty side voltage VH_HP, the second high duty side voltage VL_HP, and the upper limit frequency f_HP.

The classification region C1 is a region surrounded by the lower limit frequency f_LP, the upper limit frequency f_HP, and the first low duty side voltage VH_AP. The classification region C2 is a region surrounded by the lower limit frequency f_LP, the upper limit frequency f_HP, and the first high duty side voltage VL_AP. Note that the classification region C1 and the classification region C2 may be collectively referred to as a "classification region C."

The classification region D1 is a region surrounded by the first boundary line L1, the first low duty side voltage VH_AP, and the upper limit frequency f_HP. Here, the first boundary line L1 is a line connecting a point (coordinate) Q1 specified by the smoothing-possible frequency f_AP and the first low duty side voltage VH_AP and a point (coordinate) P1 specified by the upper limit frequency f_HP and the second low duty side voltage VH_HP. The first boundary line L1 is a characteristic line in a case where the high level period of a PWM signal Sca corresponds to one cycle (1CLK) of the measurement clock Clk.

The classification region D2 is a region surrounded by the second boundary line L2, the first high duty side voltage VL_AP, and the upper limit frequency f_HP. Here, the second boundary line L2 is a line connecting a point (coordinate) Q2 specified by the smoothing-possible frequency f_AP and the first high duty side voltage VL_AP and a point (coordinate) P2 specified by the upper limit frequency f_HP and the second high duty side voltage VL_HP. The second boundary line L2 is a characteristic line in a case where the low level period of a PWM signal Sca corresponds to one cycle (1CLK) of the measurement clock Clk. Note that the classification region D1 and the classification region D2 may be collectively referred to as a "classification region D."

The classification region E1 is a region surrounded by the first boundary line L1, the second low duty side voltage VH_HP, and the smoothing-possible frequency f_AP. The classification region E2 is a region surrounded by the second boundary line L2, the second high duty side voltage VL_HP, and the smoothing-possible frequency f_AP. Note that the classification region E1 and the classification region E2 may be collectively referred to as a "classification region E."

The measurement-type selecting unit 26 selects the capture type as the measurement type in a case where a specific point X is disposed in the classification region A. The specific point X is specified by a measured value (measured voltage value Vadm) of the smoothed voltage Vad measured by the voltage measurement unit 23 and a measured value of the frequency f measured by the first duty cycle measurement unit 24.

As described above, in a case where the frequency f of the PWM signal Sc is equal to or less than the smoothing-possible frequency f_AP, the PWM signal Sc cannot be smoothed by the smoothing circuit 13. Thus, the duty cycle of the PWM signal Sc cannot be measured using the smoothing type. Thus, in a case where the specific point X is disposed in the classification region A, the measurement-type selecting unit 26 selects the capture type, and sets the duty cycle DR1 calculated using the capture type to be the measured value of the duty cycle.

In a case where the specific point X is disposed in the classification region B, the measurement-type selecting unit 26 selects the capture type as the measurement type.

As described above, in a case where the frequency f of the PWM signal Sc is greater than the smoothing-possible frequency f_AP, variation in the smoothed voltage Vad increases when the duty cycle is at or around 50%. Thus, the duty cycle of the PWM signal Sc cannot be accurately measured using the smoothing type. Thus, in a case where the specific point X is disposed in the classification region B, the measurement-type selecting unit 26 selects the capture type, and sets the duty cycle DR1 calculated using the capture type, as the measured value of the duty cycle.

In a case where the specific point X is disposed in the classification region C, the measurement-type selecting unit 26 sets a fixed duty cycle that has been set in advance, as the measured value of the duty cycle.

As described above, the minimum duty cycle DL_AP and the maximum duty cycle DH_AP are restricted by a frequency of the measurement clock Clk. Thus, accurate measurement cannot be performed using the capture type for the PWM signal Sc having a duty cycle less than the minimum duty cycle DL_AP or for the PWM signal Sc having a duty cycle greater than the maximum duty cycle DH_AP. In addition, for such PWM signals Sc, variation in the smoothed voltage Vad is large in a case of the smoothing type.

Thus, in a case where the specific point X is disposed in the classification region C, the measurement-type selecting unit 26 sets the fixed duty cycle that has been set in advance, as the measured value of the duty cycle, without selecting either the capture type or the smoothing type as the measurement type. For example, for the measured value of the duty cycle, the measurement-type selecting unit 26 sets the duty cycle 0% in a case where the specific point X is disposed in the classification region C1, and sets the duty cycle 100% in a case where the specific point X is disposed in the classification region C2.

In a case where the specific point X is not disposed in the classification region C and the duty cycle cannot be measured using the capture type, it is considered that the specific point X is disposed in the classification region D. Thus, in a case where the specific point X is disposed in the classification region D, the measurement-type selecting unit 26 selects the smoothing type as the measurement type.

As described above, the first boundary line L1 is a characteristic line in a case where the high level period of the PWM signal Sca corresponds to one cycle (1CLK) of the measurement clock Clk. Thus, in a case where the specific point X is disposed at the left side of the first boundary line L1 in FIG. 9, this indicates that the high level period of the PWM signal Sca is shorter than one cycle (1CLK) of the measurement clock Clk, which means that the duty cycle of the PWM signal Sca cannot be measured using the capture type.

Thus, in a case where the specific point X is disposed in the classification region D1, the measurement-type selecting unit 26 selects the smoothing type to set the measured value of the duty cycle to be the duty cycle DR2 calculated using the smoothing type. This similarly applies to a case where the specific point X is disposed in the classification region D2.

In a case where the specific point X is disposed in the classification region E, the measurement-type selecting unit 26 compares the duty cycle DR1 by the first duty cycle measurement unit 24 and the duty cycle DR2 by the second duty cycle measurement unit 25, and selects the capture type or the smoothing type on the basis of the result of comparison.

Specifically, in a case where the specific point X is disposed in the classification region E, the measurement-type selecting unit 26 calculates a difference (|DR1−DR2|) between the duty cycle DR1 by the first duty cycle measurement unit 24 and the duty cycle DR2 by the second duty cycle measurement unit 25. In a case where the calculated difference is smaller than a predetermined threshold value, the measurement-type selecting unit 26 determines that the duty cycle can be accurately measured even by using the capture type, and selects the capture type. Then, the measurement-type selecting unit 26 sets the duty cycle DR1 calculated using the capture type, as the measured value of the duty cycle of the PWM signal Sc. On the other hand, in a case where the difference is equal to or more than a predetermined threshold value, the measurement-type selecting unit 26 determines that the duty cycle cannot be accurately measured by using the capture type, and selects the smoothing type. Then, the measurement-type selecting unit 26 sets the duty cycle DR2 calculated using the smoothing type, as the measured value of the duty cycle of the PWM signal Sc.

As described above, the first boundary line L1 is a characteristic line in a case where the high level period of the PWM signal Sca corresponds to one cycle (1CLK) of the measurement clock Clk. Thus, in a case where the specific point X is disposed at the right side (classification region E1) of the first boundary line L1 in FIG. 9, the high level period of the PWM signal Sca is longer than one cycle (1CLK) of the measurement clock Clk. Thus, it is possible to measure the duty cycle of the PWM signal Sca by using the capture type. However, as described above, depending on the performance of the MCU, variation in measured values of the duty cycle may increase in a case where the high level period or the low level period of the PWM signal Sca is not less than one cycle (1CLK) and less than two cycles (2CLK) of the measurement clock Clk.

Thus, in a case where the specific point X is disposed in the classification region E1, the measurement-type selecting unit 26 calculates a difference (|DR1−DR2|) between the duty cycle DR1 by the first duty cycle measurement unit 24 and the duty cycle DR2 by the second duty cycle measurement unit 25. In a case where the difference is smaller than a predetermined threshold value, the measurement-type selecting unit 26 determines that the duty cycle can be measured even by using the capture type, and selects the capture type. Then, the measurement-type selecting unit 26 sets the duty cycle DR1 calculated using the capture type, as the measured value of the duty cycle.

On the other hand, in a case where the difference is equal to or more than the predetermined threshold value, the measurement-type selecting unit 26 determines that the duty cycle cannot be accurately measured by using the capture type, and selects the smoothing type. Then, the measurement-type selecting unit 26 sets the duty cycle DR2 calculated using the smoothing type, as the measured value of the duty cycle. Note that, in a case where the specific point X is disposed in the classification region E2, the measurement-type selecting unit 26 performs the determination process similar to the process in the case where the specific point X is disposed in the classification region E1, and selects the measurement type.

In a case where the first duty cycle measurement unit 24 of the capture type does not measure the PWM signal Sca for a certain period of time, the measurement-type selecting unit 26 selects the smoothing type as the measurement type.

Specifically, in a case where the measurement-type selecting unit 26 monitors the first duty cycle measurement unit 24 as to an update of the measured value (DR1) and the duty cycle DR1 is not updated for a certain period of time, the measurement-type selecting unit 26 determines that the PWM signal cannot be measured by using the capture type, and selects the smoothing type. Then, the measurement-type selecting unit 26 sets the duty cycle DR2 calculated using the smoothing type as the measured value of the duty cycle of the PWM signal Sc.

Next, a flow of measuring a duty cycle by using the motor drive control device 1 will be described.

Figure 10:
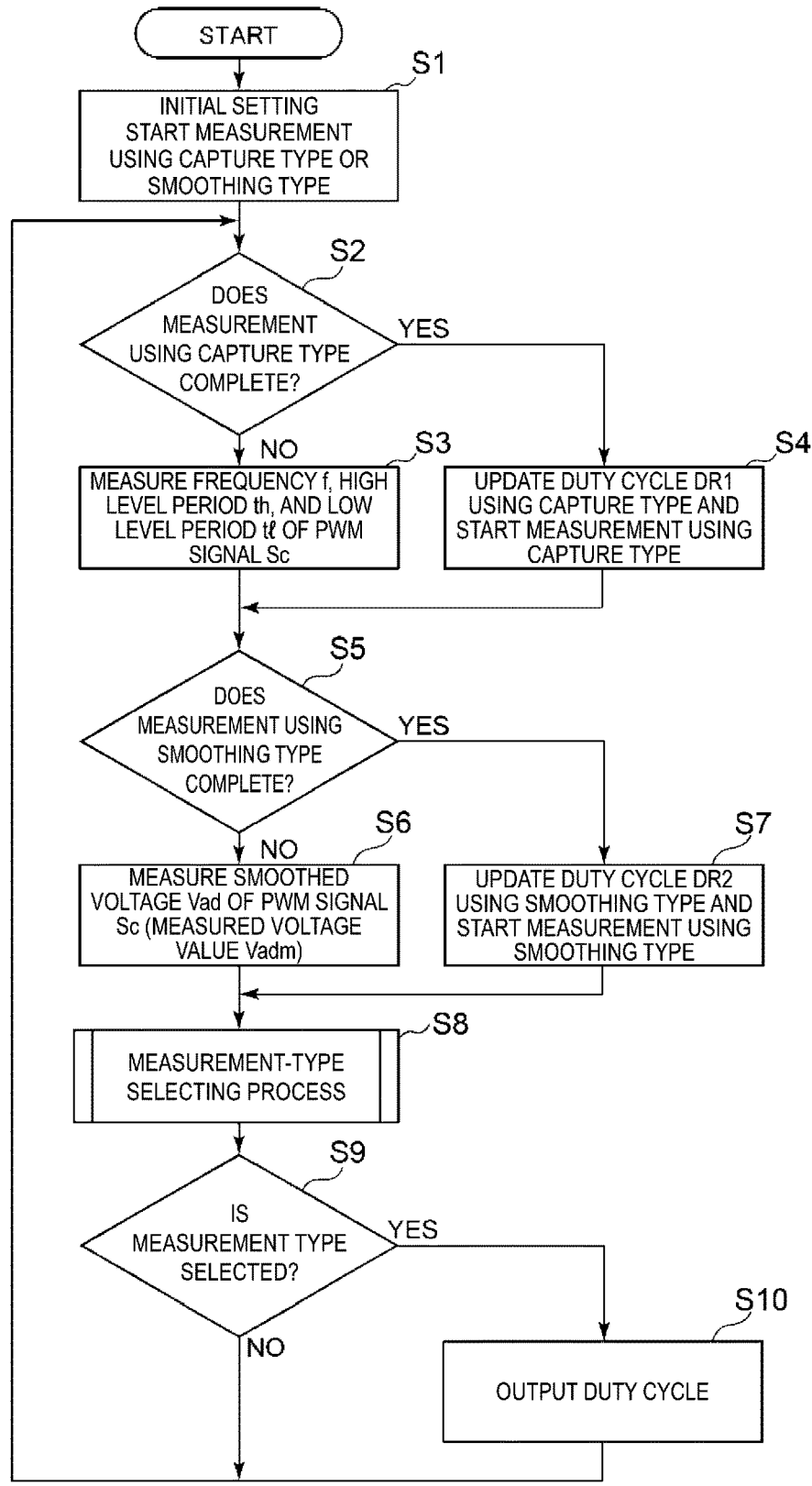
FIG. 10 is a flowchart showing a flow of a method of measuring a duty cycle in the motor drive control device according to the first embodiment.

FIG. 10 is a flowchart showing a flow of measuring a duty cycle by using the motor drive control device 1.

First, upon activation of the motor drive control device 1, the motor drive control device 1 performs initial settings on various types of parameters necessary for a process of measuring a duty cycle (step S1). For example, the motor drive control device 1 clears a value of the timer (counter) 104, and reads data such as the correspondence relationship information 250 stored in the ROM 102 of the MCU, threshold values (f_HP, f_AP, f_LP) concerning a frequency of the PWM signal Sc, threshold values (VL_AP, VL_HP, VH_HP, VH_AP) concerning a voltage obtained by smoothing the PWM signal Sc to set them in the RAM 103 or various types of registers. In addition, the motor drive control device 1 clears a measurement completion flag and an update flag of the capture type in the RAM 103, and a measurement completion flag and an update flag of the smoothing type. Furthermore, the motor drive control device 1 starts measuring, by using the capture type, a duty cycle of a PWM signal Sc (PWM signal Sca) serving as a speed instruction signal inputted from the upper layer device 3, and also starts measuring, by using the smoothing type, a smoothed voltage Vad of the PWM signal Sc by the voltage measurement unit 23.

Next, in step S2, the motor drive control device 1 determines whether measurement using the capture type completes, on the basis of the measurement completion flag of the capture type. In a case where measurement using the capture type is still being performed (step S2: NO), the first duty cycle measurement unit 24 first measures the frequency f (cycle T), the high level period th, and the low level period t1 of the PWM signal Sc using the methods described above, and sets a measurement completion flag of the capture type (step S3). In a case where measurement using the capture type completes (step S2: YES), the first duty cycle measurement unit 24 calculates the duty cycle DR1 of the PWM signal Sc using the capture type on the basis of the frequency f (cycle T), the high level period th, and the low level period t1 measured in step S3, and clears the measurement completion flag of the capture type. In addition, the first duty cycle measurement unit 24 sets an update flag of the capture type, and then, starts measurement using the next capture type (step S4).

Next, in step S5, the motor drive control device 1 determines whether measurement using the smoothing type completes, on the basis of the measurement completion flag of the smoothing type. In a case where measurement using the smoothing type is still being performed (step S5: NO), the voltage measurement unit 23 measures the smoothed voltage Vad of the PWM signal Sc, and sets the measurement completion flag of the smoothing type (step S6). In a case where measurement using the smoothing type completes (step S5: YES), the second duty cycle measurement unit 25 calculates the duty cycle DR2 of the PWM signal Sc using the methods described above and on the basis of the correspondence relationship information 250 and the measured value (measured voltage value Vadm) of the smoothed voltage Vad measured in step S6. In addition, the second duty cycle measurement unit 25 clears the measurement completion flag of the smoothing type, and sets an update flag of the smoothing type. Then, the second duty cycle measurement unit 25 starts measurement of the next smoothing type (step S7).

Next, the motor drive control device 1 performs a process (measurement-type selecting process) for selecting a measurement type for a duty cycle of the PWM signal Sc (step S8).

Figure 11A:
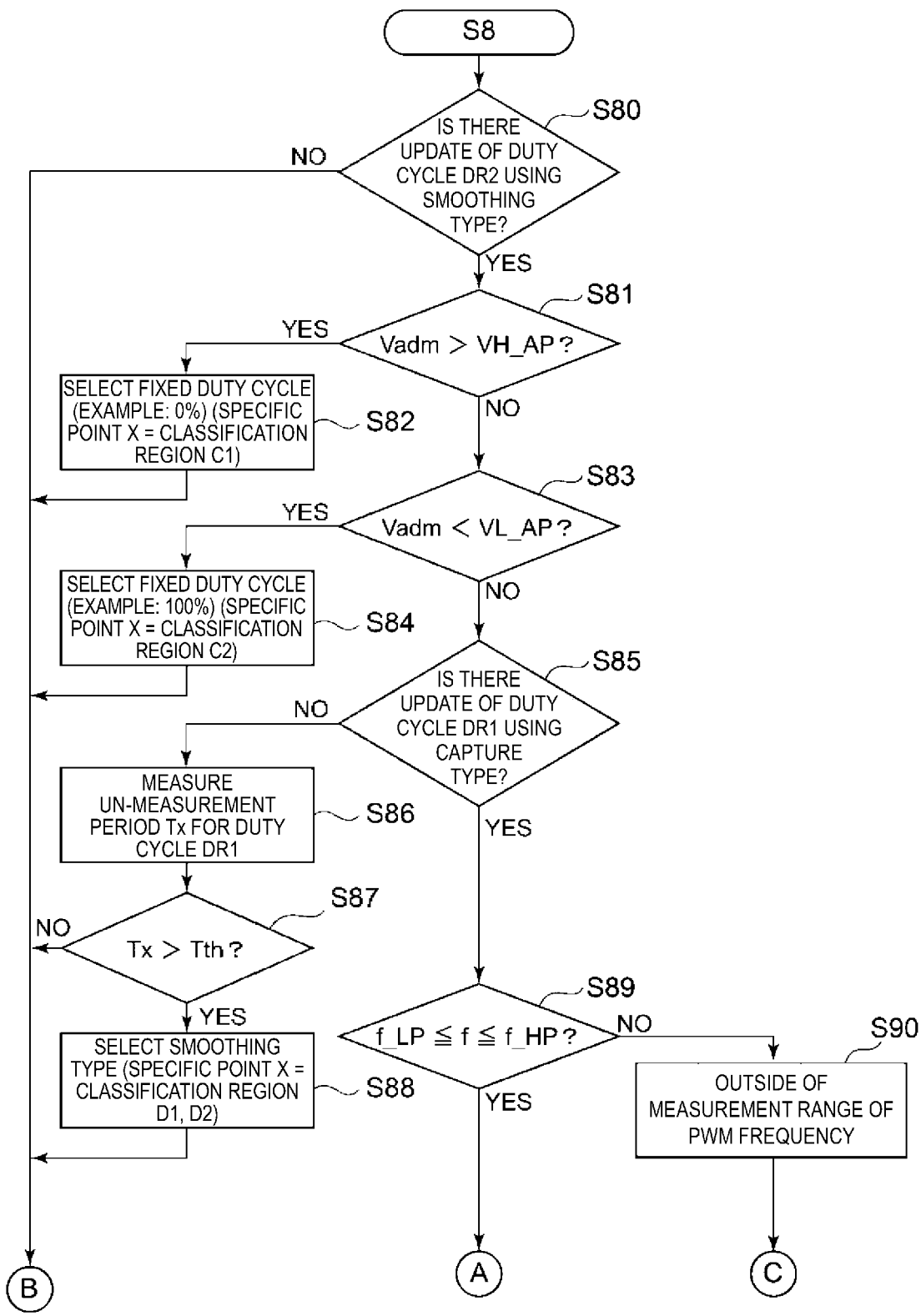
FIG. 11A is a flowchart showing a flow of a measurement-type selecting process (step S8) in the motor drive control device according to the first embodiment.
Figure 11B:
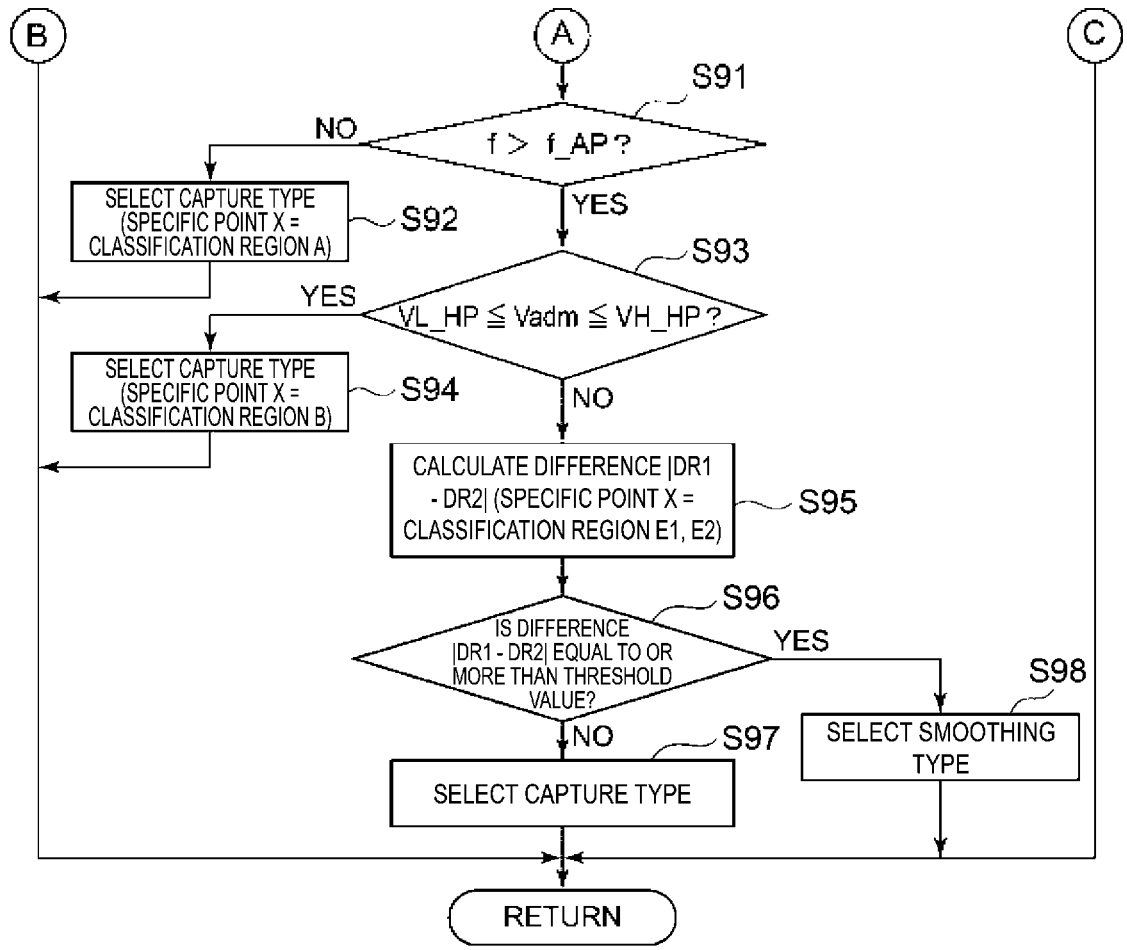
FIG. 11B is a flowchart showing a flow of the measurement-type selecting process (step S8) in the motor drive control device according to the first embodiment.

FIGS. 11A and 11B are flowcharts each showing a flow of a measurement-type selecting process (step S8) performed by the motor drive control device 1 according to the first embodiment.

First, in step S80, the measurement-type selecting unit 26 determines whether the duty cycle DR2 is updated, on the basis of the update flag of the smoothing type. In a case where the duty cycle DR2 is not updated (step S80: NO), the measurement-type selecting unit 26 does not select a measurement type and ends step S8.

On the other hand, in a case where the duty cycle DR2 is updated (step S80: YES), the measurement-type selecting unit 26 determines in step S81 whether the measured voltage value Vadm by the voltage measurement unit 23 is greater than the first low duty side voltage VH_AP.

In a case where the measured voltage value Vadm is greater than the first low duty side voltage VH_AP (step S81: YES), the measurement-type selecting unit 26 determines that the specific point X specified by the measured voltage value Vadm and the measured value of a frequency f is disposed in the classification region C1, and sets a fixed duty cycle (for example, 0%) that has been set in advance, as the measured value of the duty cycle (step S82).

On the other hand, in a case where the measured voltage value Vadm is equal to or less than the first low duty side voltage VH_AP (step S81: NO), the measurement-type selecting unit 26 determines in step S83 whether the measured voltage value Vadm is less than the first high duty side voltage VL_AP.

In a case where the measured voltage value Vadm is less than the first high duty side voltage VL_AP (step S83: YES), the measurement-type selecting unit 26 determines that the specific point X is disposed in the classification region C2, and sets a fixed duty cycle (for example, 100%) that has been set in advance, as the measured value of the duty cycle (step S84).

On the other hand, in a case where the measured voltage value Vadm is equal to or more than the first high duty side voltage VL_AP (step S83: NO), the measurement-type selecting unit 26 determines whether the duty cycle DR1 is updated by the first duty cycle measurement unit 24 of the capture type, on the basis of the update flag of the capture type (step S85).

In a case where the duty cycle DR1 is not updated in step S85 (step S85: NO), the measurement-type selecting unit 26 measures (updates) a period (un-measurement period) Tx for which the duty cycle DR1 is not updated (step S86). Next, in step S87, the measurement-type selecting unit 26 determines whether the un-measurement period Tx is greater than a certain-period threshold value Tth.

In a case where the un-measurement period Tx is equal to or less than the certain-period threshold value Tth (step S87: NO), the measurement-type selecting unit 26 does not select a measurement type and ends step S8. On the other hand, in a case where the un-measurement period Tx for which the duty cycle DR1 is not updated is greater than the certain-period threshold value Tth (step S87: YES), the measurement-type selecting unit 26 clears measurement of the un-measurement period Tx, and determines that measurement using the capture type cannot be perform and the specific point X is disposed in the classification region D1 or the classification region D2 to select the smoothing type (step S88). In addition, the measurement-type selecting unit 26 sets the duty cycle DR2 calculated using the smoothing type, as the measured value of the duty cycle.

On the other hand, in a case where the duty cycle DR1 is updated (step S85: YES), the un-measurement period Tx is cleared. In addition, in step S89, the measurement-type selecting unit 26 determines whether a frequency f of the PWM signal Sc measured by the first duty cycle measurement unit 24 is not less than the lower limit frequency f_LP and not more than the upper limit frequency f_HP.

In a case where the frequency f of the PWM signal Sc is less than the lower limit frequency f_LP or higher than the upper limit frequency f_HP (step S89: NO), the measurement-type selecting unit 26 determines that the frequency of the PWM signal falls outside of the measurement range and the duty cycle cannot be measured (step S90), and does not select a measurement type to end step S8.

On the other hand, in a case where the frequency f of the PWM signal Sc is not less than the lower limit frequency f_LP and not more than the upper limit frequency f_HP (step S89: YES), the measurement-type selecting unit 26 determines in step S91 whether the frequency f is greater than the smoothing-possible frequency f_AP.

In a case where the frequency f is equal to or less than the smoothing-possible frequency f_AP (step S91: NO), the measurement-type selecting unit 26 determines that the specific point X is disposed in the classification region A to select the capture type (step S92), and sets the duty cycle DR1 calculated using the capture type, as the measured value of the duty cycle.

On the other hand, in a case where the frequency f is higher than the smoothing-possible frequency f_AP (step S91: YES), the measurement-type selecting unit 26 determines whether the measured voltage value Vadm is not less than the second high duty side voltage VL_HP and not more than the second low duty side voltage VH_HP (step S93).

In a case where the measured voltage value Vadm is not less than the second high duty side voltage VL_HP and not more than the second low duty side voltage VH_HP in step S93 (step S93: YES), the measurement-type selecting unit 26 determines that the specific point X is disposed in the classification region B, and selects the capture type (step S94). Then, the measurement-type selecting unit 26 sets the duty cycle DR1 calculated using the capture type, as the measured value of the duty cycle.

On the other hand, in a case where the measured voltage value Vadm is less than the second high duty side voltage VL_HP or greater than the second low duty side voltage VH_HP (step S93: NO), the measurement-type selecting unit 26 determines that the specific point X is disposed in the classification region E1 or the classification region E2.

Next, the measurement-type selecting unit 26 calculates a difference (|DR1−DR2|) between the duty cycle DR1 by the first duty cycle measurement unit 24 and the duty cycle DR2 by the second duty cycle measurement unit 25 (step S95). In step S96, the measurement-type selecting unit 26 determines whether the difference calculated in step S95 is equal to or more than a predetermined threshold value.

In a case where the difference is smaller than the predetermined threshold value (step S96: NO), the measurement-type selecting unit 26 selects the capture type (step S97), and sets the duty cycle DR1 calculated using the capture type, as the measured value of the duty cycle. On the other hand, in a case where the difference is equal to or more than the predetermined threshold value (step S96: YES), the measurement-type selecting unit 26 selects the smoothing type (step S98), and sets the duty cycle DR2 calculated using the smoothing type, as the measured value of the duty cycle.

By performing the process of step S8 described above, the measurement type for the duty cycle of the PWM signal Sc is decided. In step S9, the duty cycle output unit 27 determines whether the measurement type is selected. In a case where the measurement type is selected (step S9: YES), the duty cycle output unit 27 adjusts the duty cycle of the PWM signal Sc measured using the measurement type decided in step S8 so as to match a drive state of the motor, and outputs it (step S10). Then, the update flag that has been set is cleared. On the other hand, in a case where measurement using the capture type is temporarily not updated (step S87: NO) or in a case where a frequency of the PWM signal falls outside of a measurement range (step S90) and no measurement type is selected (step S9: NO), the output value of the duty cycle is maintained to be the previous state.

After this, the control-signal generation unit 21 generates a control signal Sd on the basis of the duty cycle outputted in step S10. This enables the motor 2 to be controlled so as to rotate at a rotational speed designated by the PWM signal Sc serving as a speed instruction signal. Then, the program processing returns to step S2 to resume measurement of a duty cycle of the PWM signal Sc serving as a speed instruction signal from the upper layer device As described above, the motor drive control device 1 according to the first embodiment selects one of the capture type or the smoothing type, on the basis of a measured value (corresponding to a duty cycle of a PWM signal) of the smoothed voltage Vad obtained by smoothing the PWM signal Sc serving as a speed instruction signal and a measured value of a frequency f (or a cycle T) of the PWM signal Sc, and sets the duty cycle calculated using the selected measurement type, as the measured value of the duty cycle of the PWM signal Sc.

As described above, the range in which the duty cycle can be accurately measured using each of the measurement types is decided on the basis of a frequency of the PWM signal serving as the measurement target and a duty cycle (smoothed voltage Vad) of the PWM signal. Thus, with the motor drive control device according to the first embodiment, it is possible to highly accurately measure a duty cycle of a PWM signal in a wide frequency range, as compared with a case where the duty cycle is measured using only one of the measurement types. Furthermore, even in a case where a frequency of a speed instruction signal varies depending on applications or the like to which a motor is applied, it is not necessary to appropriately design a circuit used to measure a duty cycle of a PWM signal for each of the applications. Thus, it can be expected to reduce the design period for the motor drive control device and also reduce the manufacturing cost, as compared to the past.

In addition, with the motor drive control device 1 according to the first embodiment, an appropriate measurement type is assigned in advance to each of a plurality of classification regions A, B, C, D, and E for which classification is made on the basis of a threshold value concerning a frequency of the PWM signal Sc and a threshold value concerning a voltage obtained by smoothing the PWM signal Sc. Furthermore, the motor drive control device 1 measures the smoothed voltage Vad and the frequency f of the inputted PWM signal Sc, and on the basis of the measured values of the voltage and the frequency, the motor drive control device 1 specifies the classification region, and selects a measurement type assigned to the specified classification region. With this configuration, it is possible to easily and dynamically select an appropriate measurement type in accordance with the inputted PWM signal. In addition, an appropriate measurement can be selected by only specifying a classification region, rather than performing complicated computation. Thus, it is possible to reduce a processing load of the processor.

Embodiment 2

Figure 12:
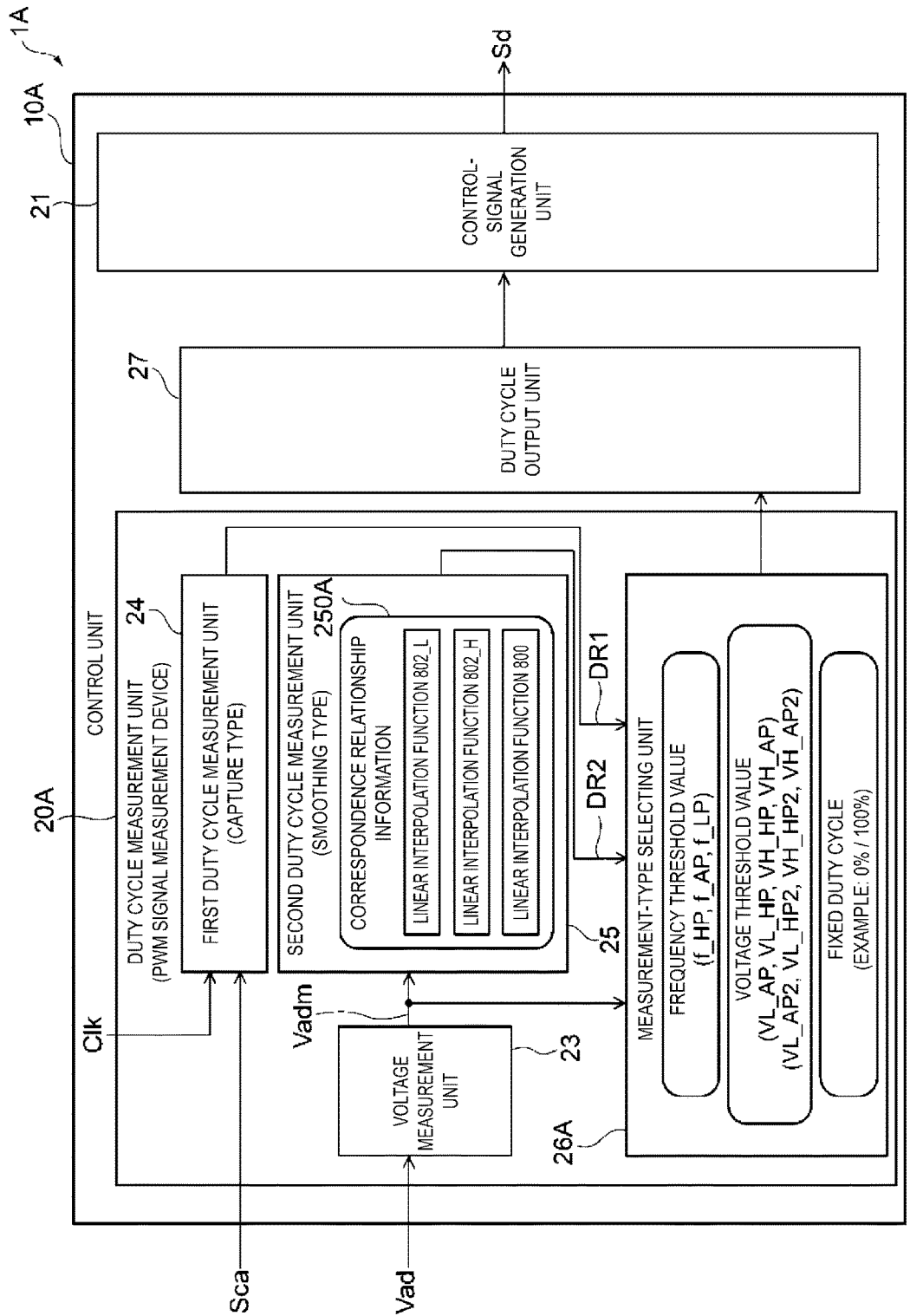
FIG. 12 is a functional block diagram of a control unit of a motor drive control device according to a second embodiment.

FIG. 12 is a functional block diagram illustrating a control unit 10A in a motor drive control device 1A according to the second embodiment.

The motor drive control device 1A according to the second embodiment differs from the motor drive control device 1 according to the first embodiment in that the plurality of classification regions for which classification is made on the basis of a threshold value concerning a frequency of the PWM signal Sc and a threshold value concerning a voltage obtained by smoothing the PWM signal Sc is more finely separated. In other points, the motor drive control device 1A is similar to the motor drive control device 1 according to the first embodiment.

As described above, depending on the performance of the MCU, variation in the measured value of the duty cycle may increase in a case where the capture type is used and the high level period th of the PWM signal serving as the measurement target is not less than 1CLK and less than 2CLK (see FIG. 5B).

Thus, in a case of the motor drive control device 1A according to the second embodiment, classification regions are set by taking into consideration a range in which the high level period th of the PWM signal serving as the measurement target is not less than 1CLK and less than 2CLK.

Specifically, as illustrated in FIG. 12, the control unit 10A of the motor drive control device 1A further includes a third low duty side voltage VH_HP2, a third high duty side voltage VL_HP2, a fourth low duty side voltage VH_AP2, and a fourth high duty side voltage VL_AP2, which serve as voltage threshold values.

Note that FIG. 12 illustrates the control unit 10A of the motor drive control device 1A according to the second embodiment, and other constituent elements are not illustrated in the drawing.

Figure 13:
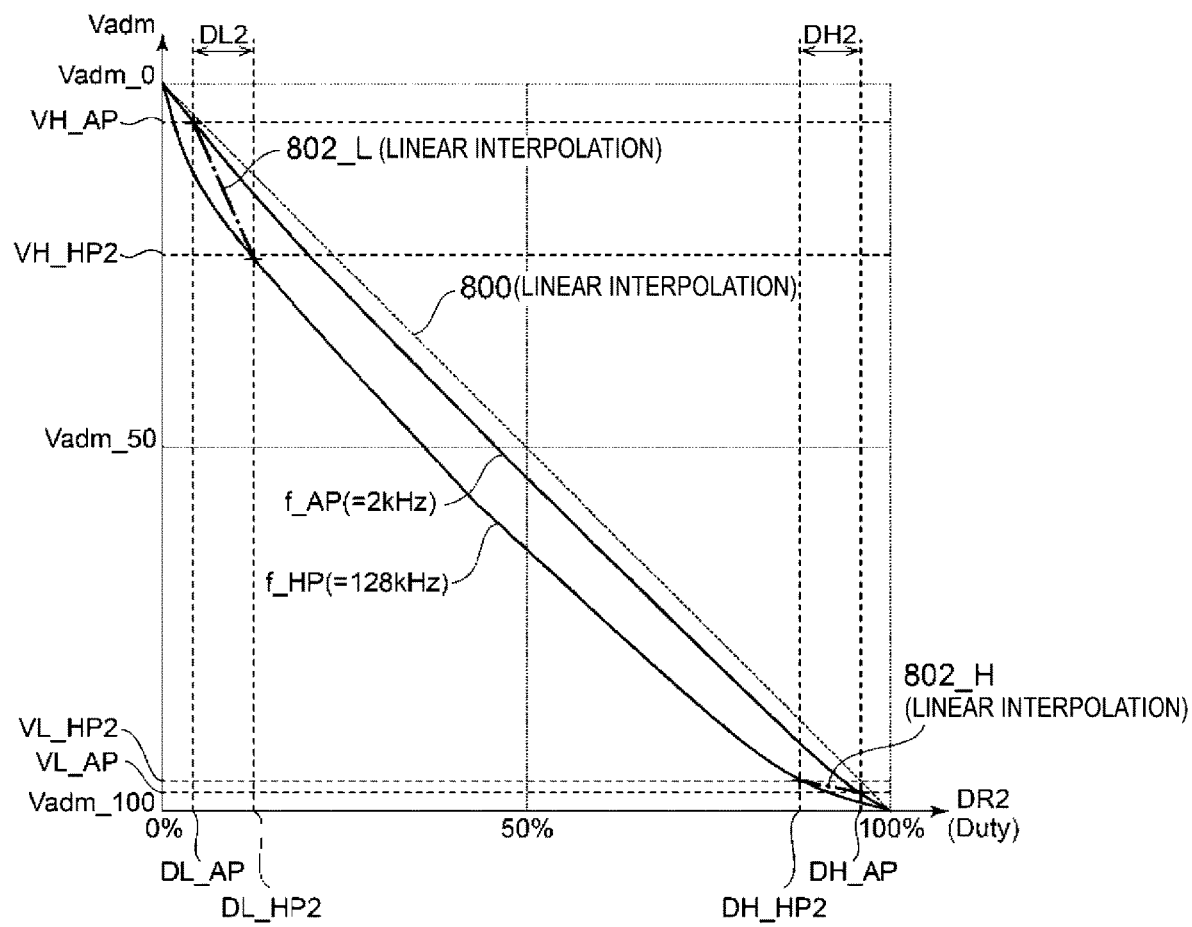
FIG. 13 is a diagram used to explain correspondence relationship information between a measured voltage value Vadm and a duty cycle of a PWM signal in the motor drive control device according to the second embodiment.

FIG. 13 is a diagram used to explain correspondence relationship information 250A between a measured voltage value Vadm and a duty cycle of a PWM signal in the motor drive control device 1A according to the second embodiment.

As illustrated in FIG. 13, the third low duty side voltage VH_HP2, the third high duty side voltage VL_HP2, the fourth low duty side voltage VH_AP2 (not illustrated), and the fourth high duty side voltage VL_AP2 (not illustrated) are voltages corresponding to duty cycles DL_HP2, DH_HP2, DL_AP2 (not illustrated), and DH_AP2 (not illustrated), respectively.

The third low duty side voltage VH_HP2 is a voltage corresponding to the minimum duty cycle DL_HP2 of a pulse having the upper limit frequency f_HP. The third low duty side voltage VH_HP2 expresses a smoothed voltage Vad (measured voltage value Vadm) corresponding to the minimum duty cycle (DL_HP2) and concerning a PWM signal Sca having a high level period corresponding to two cycles (2CLK) of the measurement clock Clk and also having a frequency being the upper limit frequency f_HP (128 kHz) (see FIG. 5B). For example, in a case where the upper limit frequency f_HP is set to 128 kHz and the frequency of the measurement clock is set to 8192 kHz, the minimum duty cycle DL_HP2 is 3.125%.

The third high duty side voltage VL_HP2 is a voltage corresponding to the maximum duty cycle DH_HP2 of a pulse having the upper limit frequency f_HP. The third high duty side voltage VL_HP2 expresses a smoothed voltage Vad (measured voltage value Vadm) corresponding to the maximum duty cycle (DH_HP2) and concerning a PWM signal Sca having a low level period corresponding to two cycles (2CLK) of the measurement clock Clk and also having a frequency being the upper limit frequency f_HP (128 kHz). For example, in a case where the upper limit frequency f_HP is set to 128 kHz and the frequency of the measurement clock is set to 8192 kHz, the maximum duty cycle DH_HP2 is 96.875%.

The fourth low duty side voltage VH_AP2 is a voltage corresponding to the minimum duty cycle DL_AP2 of a pulse having the smoothing-possible frequency f_AP. The fourth low duty side voltage VH_AP2 expresses a smoothed voltage Vad (measured voltage value Vadm) corresponding to the minimum duty cycle (DL_AP2) and concerning a PWM signal Sca having a high level period corresponding to two cycles (2CLK) of the measurement clock Clk and also having a frequency being the smoothing-possible frequency f_AP (2 kHz) (see FIG. 5B). For example, in a case where the smoothing-possible frequency f_AP is set to 2 kHz and the frequency of the measurement clock is set to 8192 kHz, the minimum duty cycle DL_AP2 is 0.049%.

The fourth high duty side voltage VL_AP2 is a voltage corresponding to the maximum duty cycle DH_AP2 of a pulse having the smoothing-possible frequency f_AP. The fourth high duty side voltage VL_AP2 expresses a smoothed voltage Vad (measured voltage value Vadm) corresponding to the maximum duty cycle (DH_AP2) and concerning a PWM signal Sca having a low level period corresponding to two cycles (2CLK) of the measurement clock Clk and also having a frequency being the smoothing-possible frequency f_AP (2 kHz). For example, in a case where the smoothing-possible frequency f_AP is set to 2 kHz and the frequency of the measurement clock is set to 8192 kHz, the maximum duty cycle DH_AP2 is 99.951%.

Instead of the linear interpolation function 801_H, 801_L used in the first embodiment, a duty cycle measurement unit 20A of the motor drive control device 1A according to the second embodiment uses a linear interpolation function 802_H, 802_L to calculate the duty cycle DR2 using the smoothing type.

Specifically, apart from the linear interpolation function 800, the linear interpolation function 802_L expressing a relationship between the measured voltage value Vadm and the duty cycle as a linear function is calculated for a range DL2 on the low duty side in FIG. 13, that is, for a range in which the measured voltage value Vadm falls in a range from the third low duty side voltage VH_HP2 to the first low duty side voltage VH_AP, and is stored in advance as the correspondence relationship information 250A in a storage device such as the ROM 102 of the MCU.

Similarly, apart from the linear interpolation function 800, the linear interpolation function 802_H expressing a relationship between the measured voltage value Vadm and the duty cycle as a linear function is calculated for a range DH2 on the high duty side in FIG. 13, that is, in a case where the measured voltage value Vadm falls in a range from the first high duty side voltage VL_AP to the third high duty side voltage VL_HP2, and is stored in advance as the correspondence relationship information 250A in a storage device such as the ROM 102 in the MCU.

The second duty cycle measurement unit 25 uses the linear interpolation functions 800, 802_H, 802_L stored in the storage device such as the ROM 102 to calculate the duty cycle DR2 corresponding to the measured voltage value Vadm acquired from the voltage measurement unit 23. That is, the second duty cycle measurement unit 25 calculates the duty cycle DR2 corresponding to the measured voltage value Vadm by using the linear interpolation function 802_H for a range of VL_AP≤Vadm<VL_HP2, using the linear interpolation function 802_L for a range of VH_HP2<Vadm≤VH_AP, and using the linear interpolation function 800 for a range of VL_HP2≤Vadm≤VH_HP2.

Figure 14:
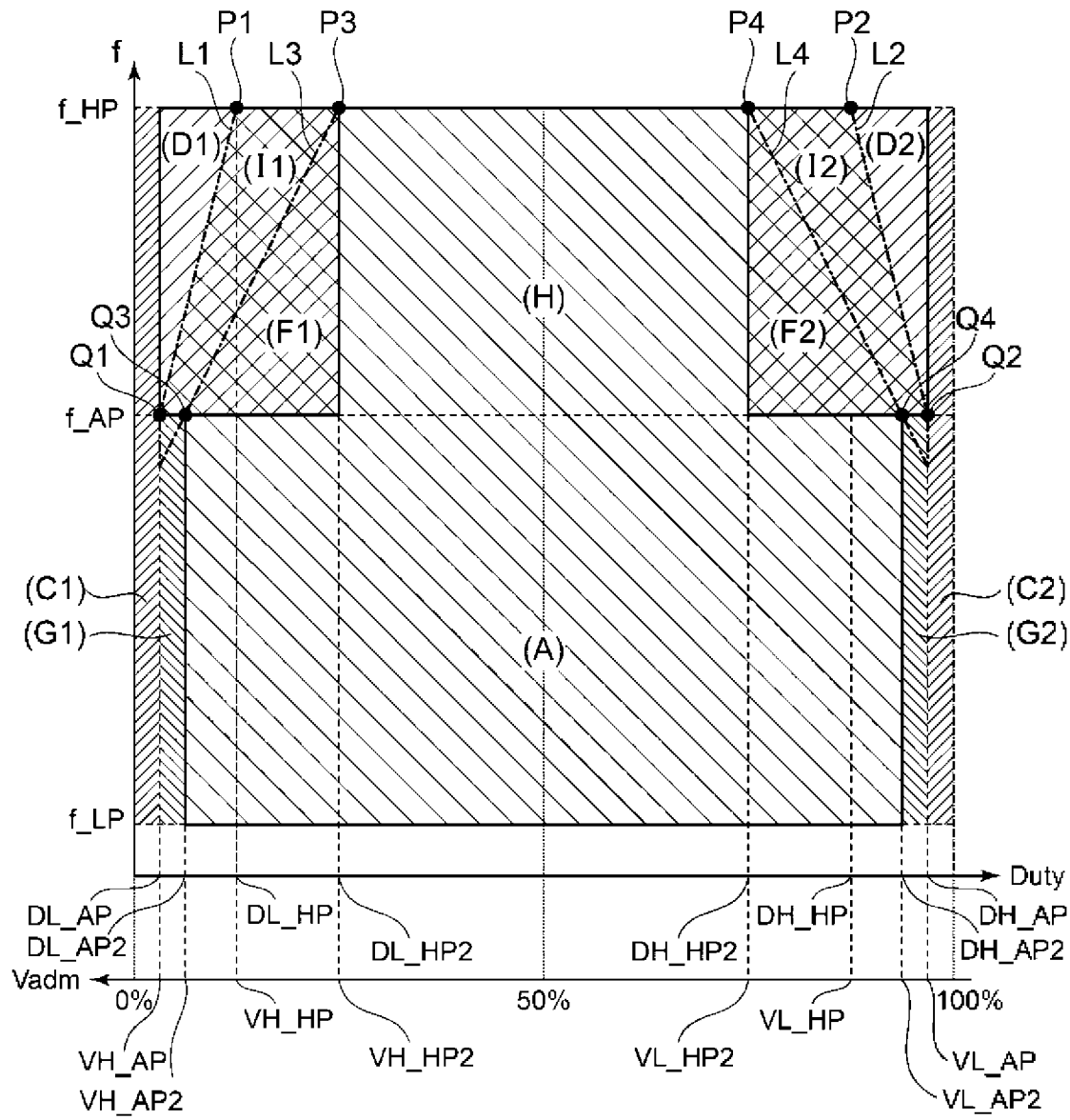
FIG. 14 is a diagram used to explain a method of selecting a measurement type for a duty cycle of a PWM signal in the motor drive control device according to the second embodiment.

FIG. 14 is a diagram used to explain a method of selecting a measurement type for a duty cycle of the PWM signal Sc in the motor drive control device 1A according to the second embodiment.

In FIG. 14, the vertical axis indicates a frequency f of the PWM signal Sc (Sca), and the horizontal axis indicates a duty cycle of the PWM signal Sc. As with FIG. 9 described above, on the horizontal axis of FIG. 14, the measured voltage values Vadm are indicated in parallel to the duty cycle, and values of the measured voltage values Vadm corresponding to duty cycles are illustrated.

FIG. 14 illustrates a plurality of classification regions A, H, C1, C2, D1, D2, F1, F2, G1, G2, I1, and I2 for which classification is made on the basis of a threshold value concerning a frequency of the PWM signal Sc and a threshold value concerning a voltage obtained by smoothing the PWM signal Sc.

As illustrated in FIG. 14, each of the classification regions A, H, C1, C2, D1, D2, F1, F2, G1, G2, I1, I2 is set on the basis of a threshold value (f_HP, f_AP, and f_LP) concerning a frequency of the PWM signal Sc described above and a threshold value (VL_AP, VH_AP, VL_HP, VH_HP, VL_AP2, VH_AP2, VL_HP2, and VH_HP2) concerning a voltage obtained by smoothing the PWM signal Sc. Below, each of the classification regions will be described.

The classification regions A, C1, C2, D1, and D2 are similar to the classification regions in the motor drive control device 1 according to the first embodiment, and hence, explanation thereof will not be repeated.

The classification region H is a region surrounded by the upper limit frequency f_HP, the smoothing-possible frequency f_AP, the third low duty side voltage VH_HP2, and the third high duty side voltage VL_HP2.

The classification region G1 is a region surrounded by the lower limit frequency f_LP, the smoothing-possible frequency f_AP, the first low duty side voltage VH_AP, and the fourth low duty side voltage VH_AP2.

The classification region G2 is a region surrounded by the lower limit frequency f_LP, the smoothing-possible frequency f_AP, the first high duty side voltage VL_AP, and the fourth high duty side voltage VL_AP2. Note that the classification region G1 and the classification region G2 may be collectively referred to as a "classification region G."

The classification region F1 is a region surrounded by the third boundary line L3, the third low duty side voltage VH_HP2, and the smoothing-possible frequency f_AP.

Here, the third boundary line L3 is a line connecting a point (coordinate) Q3 specified by the smoothing-possible frequency f_AP and the fourth low duty side voltage VH_AP2 and a point (coordinate) P3 specified by the upper limit frequency f_HP and the third low duty side voltage VH_HP2. In other words, the third boundary line L3 is a characteristic line in a case where the high level period of a PWM signal Sca corresponds to two cycles (2CLK) of the measurement clock Clk.

The classification region F2 is a region surrounded by the fourth boundary line L4, the third high duty side voltage VL_HP2, and the smoothing-possible frequency f_AP.

Here, the fourth boundary line L4 is a line connecting a point (coordinate) Q4 specified by the smoothing-possible frequency f_AP and the fourth high duty side voltage VL_AP2 and a point (coordinate) P4 specified by the upper limit frequency f_HP and the third high duty side voltage VL_HP2. In other words, the fourth boundary line L4 is a characteristic line in a case where the low level period of a PWM signal Sca corresponds to two cycles (2CLK) of the measurement clock Clk.

Note that the classification region F1 and the classification region F2 may be collectively referred to as a "classification region F."

The classification region I1 is a region surrounded by the first boundary line L1, the third boundary line L3, the smoothing-possible frequency f_AP, and the upper limit frequency f_HP. The classification region I2 is a region surrounded by the second boundary line L2, the fourth boundary line L4, the smoothing-possible frequency f_AP, and the upper limit frequency f_HP. Note that the classification region I1 and the classification region I2 may be collectively referred to as a "classification region I."

A measurement-type selecting unit 26A selects the capture type as the measurement type in a case where a specific point X is disposed in the classification region H. The specific point X is specified by a measured value (measured voltage value Vadm) of the smoothed voltage Vad measured by the voltage measurement unit 23 and a measured value of a frequency f measured by the first duty cycle measurement unit 24.

As described above, even in a case where the frequency f of the PWM signal Sc is greater than the smoothing-possible frequency f_AP, variation in the smoothed voltage Vad increases when the duty cycle is at or around 50%. Thus, the duty cycle of the PWM signal Sc cannot be accurately measured using the smoothing type. Thus, in a case where the specific point X is disposed in the classification region H, the measurement-type selecting unit 26A selects the capture type, and sets the duty cycle DR1 calculated using the capture type to be the measured value of the duty cycle.

In a case where the specific point X is disposed in the classification region G, the measurement-type selecting unit 26A sets a fixed duty cycle that has been set in advance, as the measured value of the duty cycle.

As described above, in a case where the frequency f of the PWM signal of the measurement target is equal to or less than the smoothing-possible frequency f_AP, the duty cycle cannot be measured using the smoothing type. On the other hand, by using the capture type, depending on the performance of the MCU, variation in measured values of the duty cycle may increase in a case where the duty cycle of the PWM signal is not less than one cycle (1CLK) and less than two cycles (2CLK) of the measurement clock Clk.

Thus, in a case where the specific point X is disposed in the classification region G, the measurement-type selecting unit 26A sets the fixed duty cycle that has been set in advance, as the measured value of the duty cycle, without selecting either the capture type or the smoothing type as the measurement type. For example, the measurement-type selecting unit 26A sets the duty cycle 0% as the measured value of the duty cycle in a case where the specific point X is disposed in the classification region G1, and sets the duty cycle 100% as the measured value of the duty cycle in a case where the specific point X is disposed in the classification region G2.

In a case where the specific point X is disposed in the classification region I, the measurement-type selecting unit 26A compares the duty cycle DR1 by the first duty cycle measurement unit 24 and the duty cycle DR2 by the second duty cycle measurement unit 25, and selects the capture type or the smoothing type on the basis of the result of comparison.

Specifically, in a case where the specific point X is disposed in the classification region I, the measurement-type selecting unit 26A calculates a difference (|DR1−DR2|) between the duty cycle DR1 by the first duty cycle measurement unit 24 and the duty cycle DR2 by the second duty cycle measurement unit 25. The measurement-type selecting unit 26A selects the capture type in a case where the difference is less than a predetermined threshold value, and selects the smoothing type in a case where the difference is equal to or more than the predetermined threshold value.

As described above, the first boundary line L1 exhibits a characteristic line in a case where the high level period of a PWM signal Sca corresponds to one cycle (1CLK) of the measurement clock Clk. The third boundary line L3 exhibits a characteristic line in a case where the high level period of the PWM signal Sca corresponds to two cycles (2CLK) of the measurement clock Clk. Thus, it can be said that, in a case where the specific point X is disposed between the first boundary line L1 and the third boundary line (in the classification region I1) in FIG. 14, the high level period of the PWM signal Sca is not less than one cycle (1CLK) and less than two cycles (2CLK) of the measurement clock Clk.

In addition, as described above, depending on the performance of the MCU, variation in measured values of the duty cycle using the capture type may increase in a case where the high level period or the low level period of the PWM signal Sca is not less than one cycle (1CLK) and less than two cycles (2CLK) of the measurement clock Clk.

Thus, in a case where the specific point X is disposed in the classification region I1, the measurement-type selecting unit 26A calculates a difference (|DR1−DR2|) between the duty cycle DR1 by the first duty cycle measurement unit 24 and the duty cycle DR2 by the second duty cycle measurement unit 25. In a case where the difference is smaller than a predetermined threshold value, the measurement-type selecting unit 26A determines that the duty cycle can be accurately measured even using the capture type to select the capture type, and sets the duty cycle DR1 calculated using the capture type, as the measured value of the duty cycle. On the other hand, in a case where the difference is equal to or more than the predetermined threshold value, the measurement-type selecting unit 26A determines that the duty cycle cannot be accurately measured by using the capture type to select the smoothing type, and sets the duty cycle DR2 calculated using the smoothing type, as the measured value of the duty cycle. Note that, in a case where the specific point X is disposed in the classification region I2, the measurement-type selecting unit 26A performs the determination process similar to the process in the case where the specific point X is disposed in the classification region I1, and selects the measurement type.

In a case where the specific point X is disposed in the classification region F, the measurement-type selecting unit 26A compares the duty cycle DR1 by the first duty cycle measurement unit 24 and the duty cycle DR2 by the second duty cycle measurement unit 25 as with the classification region I, and selects the capture type or the smoothing type on the basis of the result of comparison.

Figure 15A:
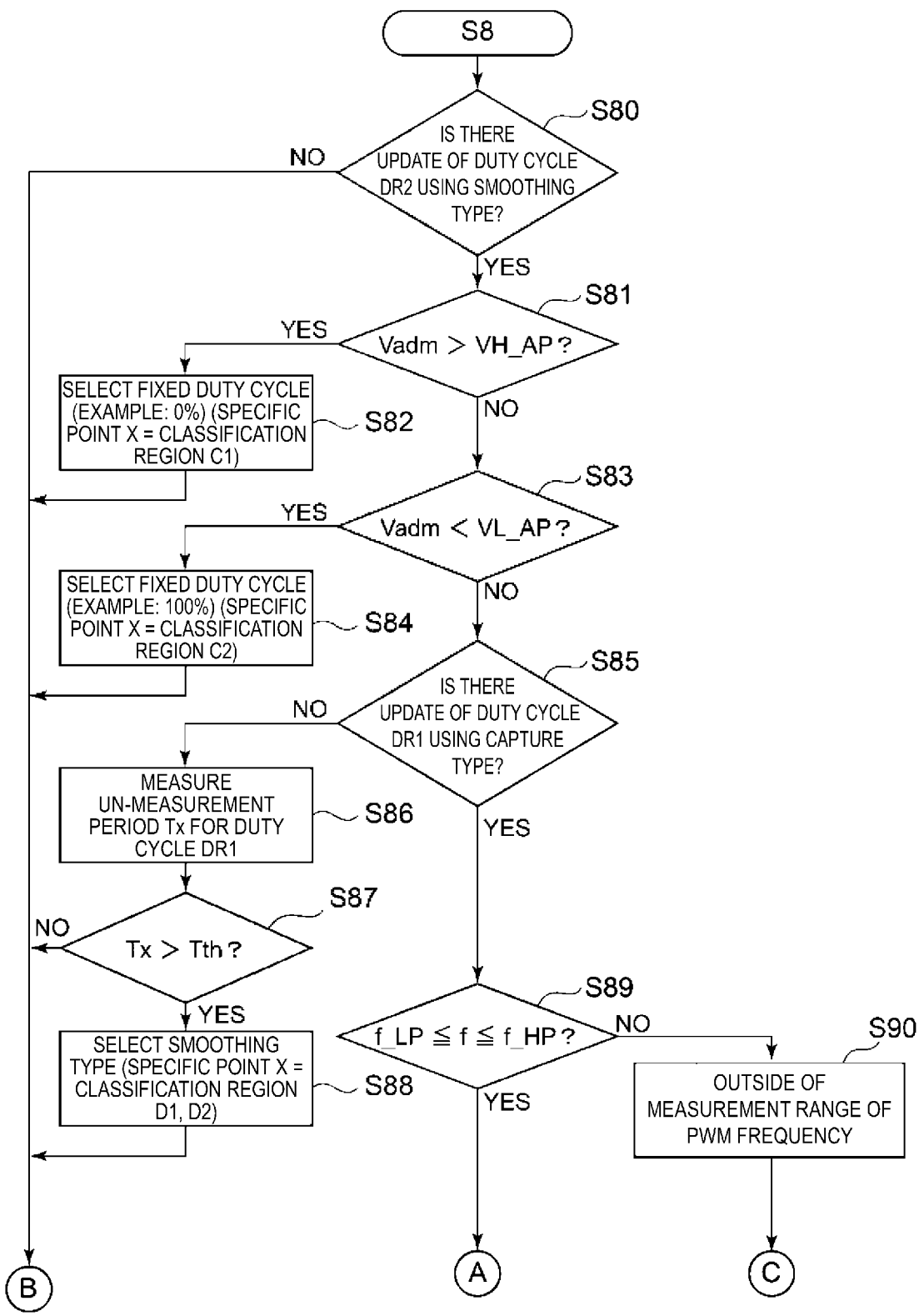
FIG. 15A is a flowchart showing a flow of a measurement-type selecting process (step S8) in the motor drive control device according to the second embodiment.
Figure 15B:
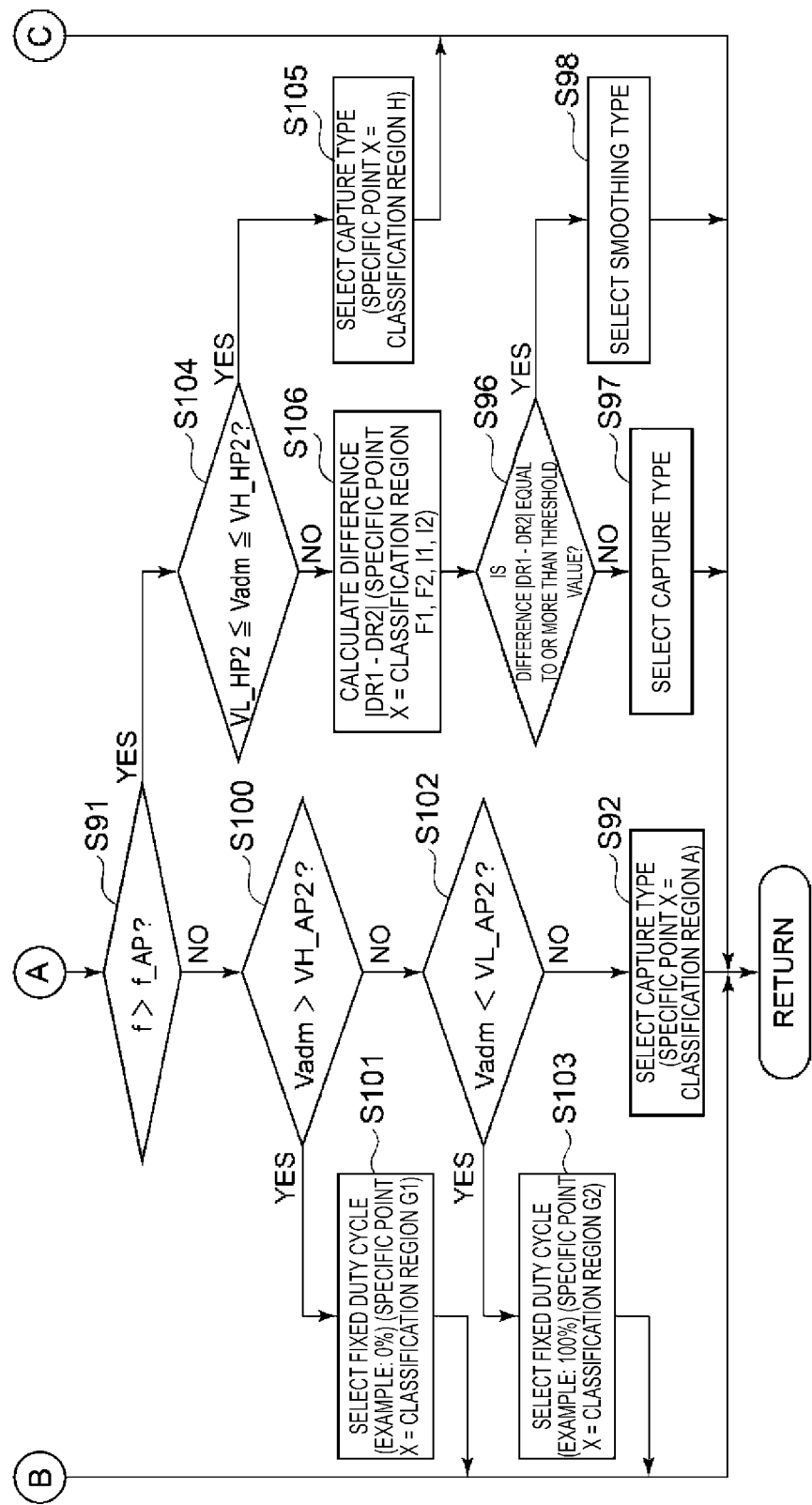
FIG. 15B is a flowchart showing a flow of the measurement-type selecting process (step S8) in the motor drive control device according to the second embodiment.

FIGS. 15A and 15B are flowcharts each showing a flow of a measurement-type selecting process (step S8) by the motor drive control device 1A according to the second embodiment.

In the flowcharts shown in FIGS. 15A and 15B, the processes from step S80 to step S90 are similar to the processes of the flowcharts shown in FIGS. 11A and 11B, and hence, explanation of these processes will not be repeated.

In a case where the frequency f is equal to or less than the smoothing-possible frequency f_AP in step S91 (step S91: NO), the measurement-type selecting unit 26A determines in step S100 whether the measured voltage value Vadm is greater than the fourth low duty side voltage VH_AP2.

In a case where the measured voltage value Vadm is greater than the fourth low duty side voltage VH_AP2 (step S100: YES), the measurement-type selecting unit 26A determines that the specific point X is disposed in the classification region G1, and sets a fixed duty cycle (for example, 0%) as the measured value of the duty cycle (step S101).

On the other hand, in a case where the measured voltage value Vadm is equal to or less than the fourth low duty side voltage VH_AP2 (step S100: NO), the measurement-type selecting unit 26A determines in step S102 whether the measured voltage value Vadm is less than the fourth high duty side voltage VL_AP2.

In a case where the measured voltage value Vadm is less than the fourth high duty side voltage VL_AP2 (step S102: YES), the measurement-type selecting unit 26A determines that the specific point X is disposed in the classification region G2, and sets a fixed duty cycle (for example, 100%) as the measured value of the duty cycle (step S103).

On the other hand, in a case where the measured voltage value Vadm is equal to or more than the fourth high duty side voltage VL_AP2 (step S102: NO), the measurement-type selecting unit 26A determines that the specific point X is disposed in the classification region A to select the capture type (step S92), and sets the duty cycle DR1 calculated using the capture type, as the measured value of the duty cycle.

In addition, in a case where the frequency f is greater than the smoothing-possible frequency f_AP in step S91 (step S91: YES), the measurement-type selecting unit 26A determines in step S104 whether the measured voltage value Vadm is not less than the third high duty side voltage VL_HP2 and not more than the third low duty side voltage VH_HP2.

In a case where the measured voltage value Vadm is not less than the third high duty side voltage VL_HP2 and not more than the third low duty side voltage VH_HP2 (step S104: YES), the measurement-type selecting unit 26A determines that the specific point X is disposed in the classification region H to select the capture type (step S105), and sets the duty cycle DR1 calculated using the capture type, as the measured value of the duty cycle.

On the other hand, in a case where the measured voltage value Vadm is less than the third high duty side voltage VL_HP2 or is greater than the third low duty side voltage VH_HP2 (step S104: NO), the measurement-type selecting unit 26A determines that the specific point X is disposed in the classification region F1, the classification region F2, the classification region I1, or the classification region I2 (step S106).

In a case where the specific point X is disposed in the classification region F1, the classification region F2, the classification region I1, or the classification region I2 in step S106, the measurement-type selecting unit 26A selects the capture type to set the duty cycle DR1 as the measured value of the duty cycle or selects the smoothing type to set the duty cycle DR2 as the measured value of the duty cycle, on the basis of a difference (|DR1−DR2|) between the duty cycle DR1 by the first duty cycle measurement unit 24 and the duty cycle DR2 by the second duty cycle measurement unit 25, as with the motor drive control device 1 according to the first embodiment (steps S96 to S98).

By performing each of the processes in the order described above, the motor drive control device 1A decides a measurement type for the duty cycle of the PWM signal Sc. In step S9, the duty cycle output unit 27 determines whether the measurement type is selected. In a case where the measurement type is selected (step S9: YES), the duty cycle output unit 27 adjusts the duty cycle measured using the measurement type decided in step S8 so as to match a drive state of the motor, and outputs it (step S10). Then, the update flag that has been set is cleared. On the other hand, in a case where measurement using the capture type is temporarily not updated (step S87: NO) or in a case where a frequency of the PWM signal falls outside of a measurement range (step S90) and no measurement type is selected (step S9: NO), the output value of the duty cycle is maintained to be the previous state.

After this, the control-signal generation unit 21 generates a control signal Sd on the basis of the duty cycle outputted in step S10. This enables the motor 2 to be controlled so as to rotate at a rotational speed designated by the PWM signal Sc serving as a speed instruction signal. Then, the program processing returns to step S2 to resume measurement of a duty cycle of the PWM signal Sc serving as a speed instruction signal from the upper layer device 3.

As described above, the motor drive control device 1A according to the second embodiment further sets classification regions F1, F2, I1, and I2 for which the high level period or the low level period of the PWM signal Sca is not less than one cycle (1CLK) and less than two cycles (2CLK) of the measurement clock Clk. In a case where the specific point X is disposed in the classification region F1, F2, I1, or I2, the motor drive control device 1A selects one of the capture type or the smoothing type on the basis of a difference (|DR1−DR2|) between the duty cycle DR1 by the first duty cycle measurement unit 24 and the duty cycle DR2 by the second duty cycle measurement unit 25. The motor drive control device 1A sets a duty cycle calculated using the selected measurement type, as the measured value of the duty cycle of the PWM signal Sc.

This makes it possible to output the measured value of the duty cycle using the smoothing type even in a case where the duty cycle cannot be measured by using the capture type due to the performance of the MCU or the like, which makes it possible to achieve highly accurate measurement of the duty cycle.

Expansion of Embodiment

The invention conceived by the present inventors has been described in detail above with reference to the embodiments. However, the present invention is not limited to the embodiments, and of course, various modifications can be made without departing from the gist of the present invention.

For example, the embodiments described above give, as an example, a case in which the configuration for measuring the duty cycle of the PWM signal serving as a speed instruction signal is applied to the motor drive control device 1, 1A. However, the configuration is not limited to this. For example, it is possible to use the duty cycle measurement unit 20, 20A of the motor drive control device 1, 1A as a PWM signal measurement device and apply it to an application (device) other than the motor drive control device.

In addition, the embodiments described above give, as an example, a case in which three parameters of a cycle, a high level period, and a low level period are measured in terms of measurement of a PWM signal using the capture type. However, it may be possible to measure two parameters and use calculation to complement a value of the other parameter.

Furthermore, the duty cycle may be calculated by accumulating measurements of both level periods of a plurality of PWM signals for a certain period of time.

In addition, the embodiments described above give, as an example, a case in which the measured voltage value Vadm is the maximum value when the duty cycle of the PWM signal is 0% and is the minimum value when the duty cycle is 100%. However, by using calculation by the MCU, application is possible even in a case where the measured voltage value Vadm is the maximum value when the duty cycle of the PWM signal is 100% and is the minimum value when the duty cycle is 0%.

Furthermore, the smoothing-possible frequency (f_AP) defining a frequency of the PWM signal at which the duty cycle can be measured using the smoothing type is not limited to a single frequency, and may be changed according to a smoothed voltage.

In addition, the embodiments described above give, as an example, a case in which the measurement-type selecting unit 26 selects one of the capture type or the smoothing type on the basis of a difference (|DR1−DR2|) in a case where a specific point X is disposed in the classification region E1, E2. However, there is no limitation to this. For example, in a case where a specific point X is disposed in the classification region E1, E2, the measurement-type selecting unit 26 may select the capture type as in the case of the classification region B. That is, the measurement-type selecting unit 26 determines whether a specific point X is disposed in a predetermined classification region (E1+E2+B) surrounded by the first boundary line L1, the second boundary line L2, the smoothing-possible frequency f_AP, and the upper limit frequency f_HP. In a case where the specific point X is disposed in the predetermined classification region, the measurement-type selecting unit 26 may select the capture type.

In addition, the flowcharts described above are given as one example for the purpose of explaining operations, and there is no limitation to this. That is, the steps are illustrated in the flowchart in each of the drawings to give specific examples, and are not given for the purpose of limiting to the flow. For example, the order of processes may be partially changed or another process may be inserted between individual processes or part of the processes may be performed in parallel.

REFERENCE SIGNS LIST

100 . . . Motor unit
1, 1A . . . Motor drive control device
2 . . . Motor
3 . . . Upper layer device
10, 10A . . . Control unit
11 . . . Motor driving unit
12 . . . PWM input circuit
13 . . . Smoothing circuit
101 . . . Processor
102 . . . ROM 103 . . . RAM
104 . . . Timer (counter)
105 A-D conversion circuit
107 . . . Input-output I/F circuit
108 . . . Clock generation circuit
20, 20A . . . Duty cycle measurement unit (PWM signal measurement device)
21 . . . Control-signal generation unit
23 . . . Voltage measurement unit
24 . . . First duty cycle measurement unit
25 . . . Second duty cycle measurement unit
26, 26A . . . Measurement-type selecting unit
27 . . . Duty cycle output unit
250, 250A . . . Correspondence relationship information
Clk . . . Measurement clock
A, B, C, C1, C2, D, D1, D2, E, E1, E2, F, F1, F2, G, G1, G2, H, I, I1, I2 . . . Classification region
DR1, DR2 . . . Measured value of duty cycle
f_AP . . . Smoothing-possible frequency
f_HP . . . Upper limit frequency
f_LP . . . Lower limit frequency
L1 . . . First boundary line
L2 . . . Second boundary line
L3 . . . Third boundary line
L4 . . . Fourth boundary line
Sc . . . Speed instruction signal (PWM signal)
Sd . . . Control signal
Vad . . . Smoothed voltage
Vadm . . . Measured voltage value
VH_AP . . . First low duty side voltage
VH_AP2 . . . Fourth low duty side voltage
VH_HP . . . Second low duty side voltage
VH_HP2 . . . Third low duty side voltage
VL_AP . . . First high duty side voltage
VL_AP2 . . . Fourth high duty side voltage
VL_HP . . . Second high duty side voltage
VL_HP2 . . . Third high duty side voltage.

The invention claimed is:

1. A PWM signal measurement device comprising:
a first duty cycle measurement unit of a capture type configured to use a measurement clock to measure a period based on an edge of a PWM signal that has been inputted, to measure a frequency and a duty cycle of the PWM signal on a basis of a measured value of the period;
a voltage measurement unit configured to measure a smoothed voltage obtained by smoothing the PWM signal using a smoothing circuit;
a second duty cycle measurement unit of a smoothing type configured to measure a duty cycle of the PWM signal on a basis of a measured voltage value of the smoothed voltage; and
a measurement-type selecting unit configured to select one of the capture type or the smoothing type as a measurement type for measuring a duty cycle of the PWM signal, on a basis of a measured value of the frequency of the PWM signal and a measured value of the smoothed voltage.

2. The PWM signal measurement device according to claim 1, wherein
at least one of the capture type or the smoothing type is assigned, as the measurement type, to each of a plurality of classification regions for which classification is made on a basis of a threshold value concerning a frequency of the PWM signal and a threshold value concerning a voltage obtained by smoothing the PWM signal, and
the measurement-type selecting unit specifies at least one classification region of the plurality of classification regions on a basis of a measured value of the smoothed voltage and a measured value of a frequency of the PWM signal, and selects the measurement type assigned to the specified at least one classification region.

3. The PWM signal measurement device according to claim 2, wherein
the threshold value concerning a frequency of the PWM signal includes:
an upper limit frequency defining an upper limit of a frequency of the PWM signal at which a duty cycle can be measured with the capture type;
a lower limit frequency defining a lower limit of a frequency of the PWM signal at which a duty cycle can be measured with the capture type; and
a smoothing-possible frequency falling in a range between the upper limit frequency and the lower limit frequency and defining a frequency of the PWM signal at which a duty cycle can be measured with the smoothing type, and
the measurement-type selecting unit selects the capture type in a case where a measured value of a frequency of the PWM signal is equal to or less than the smoothing-possible frequency, and selects the capture type or the smoothing type in a case where the measured value of the frequency of the PWM signal is higher than the smoothing-possible frequency.

4. The PWM signal measurement device according to claim 3, wherein
the threshold value concerning a voltage obtained by smoothing the PWM signal includes:
a first low duty side voltage corresponding to a duty cycle of a pulse having a frequency being the smoothing-possible frequency and including a one-side level period corresponding to one cycle of the measurement clock; and
a first high duty side voltage corresponding to a duty cycle of a pulse having a frequency being the smoothing-possible frequency and including an other-side level period corresponding to one cycle of the measurement clock, and
the measurement-type selecting unit selects a fixed duty cycle that has been set in advance in a case where a measured value of the smoothed voltage falls in a classification region surrounded by the first low duty side voltage, the upper limit frequency, and the lower limit frequency, or in a case where the measured value of the smoothed voltage falls in a classification region surrounded by the first high duty side voltage, the upper limit frequency, and the lower limit frequency.

5. The PWM signal measurement device according to claim 4, wherein
the threshold value concerning a voltage obtained by smoothing the PWM signal includes:
a second low duty side voltage corresponding to a duty cycle of a pulse having a frequency being the upper limit frequency and including a one-side level period corresponding to one cycle of the measurement clock; and
a second high duty side voltage corresponding to a duty cycle of a pulse having a frequency being the upper limit frequency and including an other-side level period corresponding to one cycle of the measurement clock, the plurality of classification regions include:
a first classification region surrounded by the first low duty side voltage, the upper limit frequency, and a first boundary line connecting the first low duty side voltage at the smoothing-possible frequency and the second low duty side voltage at the upper limit frequency; and
a second classification region surrounded by the first high duty side voltage, the upper limit frequency, and a second boundary line connecting the first high duty side voltage at the smoothing-possible frequency and the second high duty side voltage at the upper limit frequency, and
the measurement-type selecting unit selects the smoothing type in a case where a specific point specified by a measured value of the smoothed voltage and a measured value of the frequency is disposed in the first classification region or in a case where the specific point is disposed in the second classification region.

6. The PWM signal measurement device according to claim 5, wherein
the plurality of classification regions further include a predetermined classification region surrounded by: the first boundary line connecting the first low duty side voltage at the smoothing-possible frequency and the second low duty side voltage at the upper limit frequency; the second boundary line connecting the first high duty side voltage at the smoothing-possible frequency and the second high duty side voltage at the upper limit frequency; the smoothing-possible frequency; and the upper limit frequency, and
the measurement-type selecting unit selects the capture type in a case where the specific point is disposed in the predetermined classification region.

7. The PWM signal measurement device according to claim 5, wherein
the plurality of classification regions further include:
a third classification region surrounded by the first boundary line, the second low duty side voltage, and the smoothing-possible frequency; and
a fourth classification region surrounded by the second boundary line, the second high duty side voltage, and the smoothing-possible frequency,
the measurement-type selecting unit calculates a difference between a measured value of a duty cycle by the first duty cycle measurement unit and a measured value of a duty cycle by the second duty cycle measurement unit in a case where the specific point is disposed in the third classification region or in a case where the specific point is disposed in the fourth classification region,
the measurement-type selecting unit selects the capture type in a case where the difference is smaller than a predetermined threshold value, and
the measurement-type selecting unit selects the smoothing type in a case where the difference is equal to or more than the predetermined threshold value.

8. The PWM signal measurement device according to claim 5 comprising:
a third low duty side voltage corresponding to a duty cycle of a pulse having a frequency being the upper limit frequency and including a one-side level period corresponding to two cycles of the measurement clock; and
a third high duty side voltage corresponding to a duty cycle of a pulse having a frequency being the upper limit frequency and including an other-side level period corresponding to two cycles of the measurement clock, wherein the plurality of classification regions include:
a third classification region surrounded by the third low duty side voltage, the first boundary line, the smoothing-possible frequency, and the upper limit frequency; and
a fourth classification region surrounded by the third high duty side voltage, the second boundary line, the smoothing-possible frequency, and the upper limit frequency,
the measurement-type selecting unit calculates a difference between a measured value of a duty cycle by the first duty cycle measurement unit and a measured value of a duty cycle by the second duty cycle measurement unit in a case where the specific point is disposed in the third classification region or in the fourth classification region,
the measurement-type selecting unit selects the capture type in a case where the difference is smaller than a predetermined threshold value, and
the measurement-type selecting unit selects the smoothing type in a case where the difference is equal to or more than the predetermined threshold value.

9. The PWM signal measurement device according to claim 8, wherein
the threshold value concerning a voltage obtained by smoothing the PWM signal includes:
a fourth low duty side voltage corresponding to a duty cycle of a pulse having a frequency being the smoothing-possible frequency and including a one-side level period corresponding to two cycles of the measurement clock; and
a fourth high duty side voltage corresponding to a duty cycle of a pulse having a frequency being the smoothing-possible frequency and including an other-side level period corresponding to two cycles of the measurement clock,
the plurality of classification regions further include:
a fifth classification region surrounded by the first low duty side voltage, the fourth low duty side voltage, the smoothing-possible frequency, and the lower limit frequency; and
a sixth classification region surrounded by the first high duty side voltage, the fourth high duty side voltage, the smoothing-possible frequency, and the lower limit frequency, and
the measurement-type selecting unit selects a fixed duty cycle that has been set in advance, in a case where the specific point is disposed in the fifth classification region or in a case where the specific point is disposed in the sixth classification region.

10. The PWM signal measurement device according to claim 2, wherein
the measurement-type selecting unit selects the smoothing type in a case where the first duty cycle measurement unit does not measure a duty cycle for a certain period of time.

11. A motor drive control device comprising:
a PWM input circuit configured to receive input of a PWM signal;
a smoothing circuit configured to smooth the PWM signal;
a control unit configured to generate a control signal and including the PWM signal measurement device according to claim 1 configured to input the PWM signal inputted in the PWM input circuit and also input, as the smoothed voltage, a voltage obtained by smoothing the PWM signal by the smoothing circuit; and a motor driving unit configured to drive a motor on a basis of the control signal.

12. A method of measuring a PWM signal, comprising:

a first duty cycle measurement step using a capture type including measuring a period based on an edge of an inputted PWM signal using a measurement clock to measure a frequency and a duty cycle of the PWM signal on a basis of a measured value of the period;

a voltage measurement step of measuring a smoothed voltage obtained by smoothing the PWM signal using a smoothing circuit;

a second duty cycle measurement step using a smoothing type including measuring a duty cycle of the PWM signal on a basis of a measured value of the smoothed voltage; and a measurement-type selecting step of selecting one of the capture type or the smoothing type as a measurement type for measuring a duty cycle of the PWM signal on a basis of a measured value of the frequency of the PWM signal and a measured value of the smoothed voltage.

13. A method of controlling motor drive, comprising:

a PWM input step of receiving input of a PWM signal;

a smoothing step of smoothing the PWM signal;

a first duty cycle measurement step using a capture type including measuring a period based on an edge of the PWM signal using a measurement clock to measure a frequency and a duty cycle of the PWM signal on a basis of a measured value of the period;

a voltage measurement step of measuring a smoothed voltage obtained by smoothing the PWM signal using a smoothing circuit;

a second duty cycle measurement step using a smoothing type including measuring a duty cycle of the PWM signal on a basis of a measured value of the smoothed voltage;

a measurement-type selecting step of selecting one of the capture type or the smoothing type as a measurement type for measuring a duty cycle of the PWM signal on a basis of a measured value of the frequency of the PWM signal and a measured value of the smoothed voltage;

a control step of generating a control signal on a basis of the measurement type selected in the measurement-type selecting step; and a motor drive step of driving a motor on a basis of the control signal.

* * * * *